US006461086B1

(12) United States Patent
Milanowski et al.

(10) Patent No.: US 6,461,086 B1
(45) Date of Patent: Oct. 8, 2002

(54) METHOD AND APPARATUS FOR DELIVERING PARTICULATE MATERIAL TO AN AIR STREAM

(75) Inventors: Steven Paul Milanowski, Waupaca, WI (US); Michael Barth Venturino, Appleton, WI (US); Susan Joan Daniels, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 3 days.

(21) Appl. No.: 09/723,995

(22) Filed: Nov. 28, 2000

(51) Int. Cl.[7] ............................................... B65G 53/52
(52) U.S. Cl. ........................ 406/92; 406/173; 406/57
(58) Field of Search .......................... 406/92, 153, 23, 406/32, 136, 46, 144, 173, 94, 57

(56) References Cited

U.S. PATENT DOCUMENTS

| 660,458 A | * | 10/1900 | Pruden ................... 110/104 R |
| 3,301,606 A | * | 1/1967 | Bruno ......................... 15/409 |
| 4,028,009 A | * | 6/1977 | Gudzenko et al. ............. 166/51 |
| 4,100,324 A | | 7/1978 | Anderson et al. |
| 4,666,647 A | | 5/1987 | Enloe et al. |
| 4,761,258 A | | 8/1988 | Enloe |
| 4,927,582 A | | 5/1990 | Bryson |
| 5,028,224 A | | 7/1991 | Pieper et al. |
| 5,494,622 A | * | 2/1996 | Heath et al. ................. 156/276 |
| 5,651,862 A | | 7/1997 | Anderson et al. |
| 5,762,844 A | * | 6/1998 | Van Himbergen et al. .. 264/112 |
| 5,924,823 A | * | 7/1999 | Palffy .......................... 15/420 |
| 6,046,377 A | | 4/2000 | Huntoon et al. |

* cited by examiner

*Primary Examiner*—Christopher P. Ellis
*Assistant Examiner*—Richard Ridley
(74) *Attorney, Agent, or Firm*—Paul Y. Yee; John L. Brodersen

(57) ABSTRACT

An apparatus and process for directing particulate material (22) into a moving gas stream includes a delivering of the particulate material (22) from a particulate reservoir (24) along a delivery direction (118) into a housing (30) having a housing axis (32). A housing gas flow is introduced into the housing (30) through at least one entry gas port (40) that has been provided in the housing (30). The housing gas flow is arranged to combine with the particulate material (22) that is delivered from the particulate reservoir (24). A swirling motion is imparted to the housing gas flow, and the swirling motion has at least a rotational component (110) of movement which is directed substantially circumferentially about the housing axis (32).

20 Claims, 22 Drawing Sheets

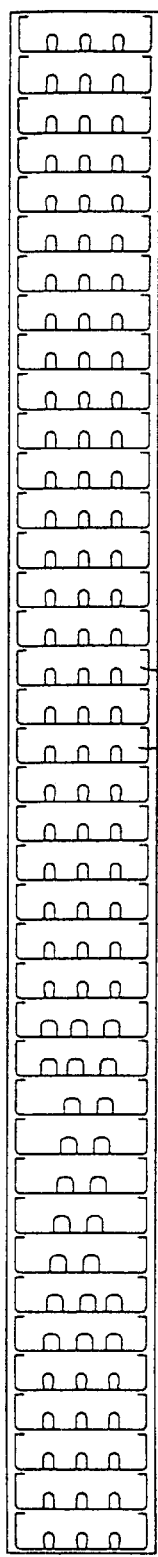
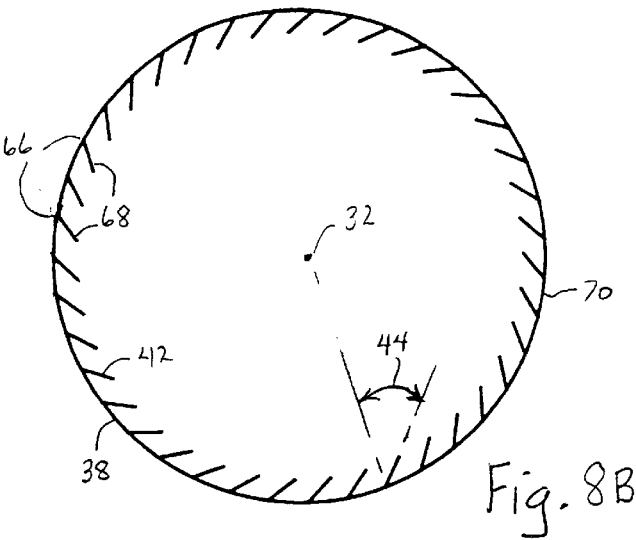
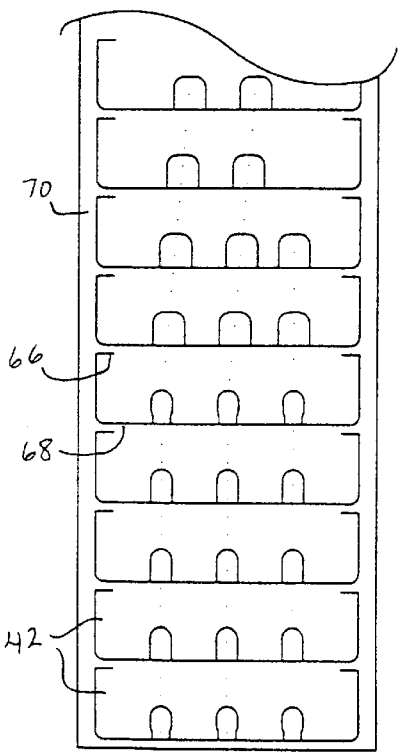
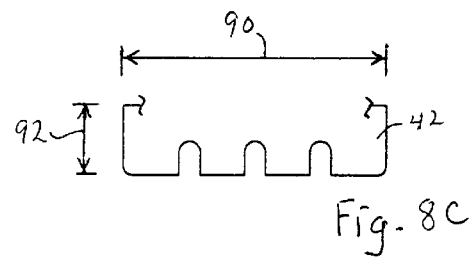
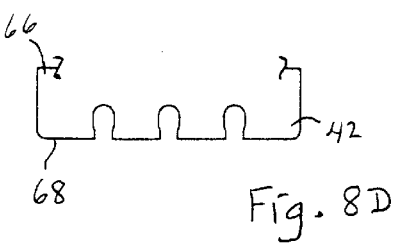
Fig. 8
Fig. 8A
Fig. 8B
Fig. 8C
Fig. 8D ed amounts of particulate material into a moving air stream to transport the particulate material through various processes and equipment. For example, absorbent articles and structures, such as absorbent pads and absorbent cores, have been formed by employing various techniques, such as wet forming techniques, and air laying techniques. Additionally, selected amounts of superabsorbent particles have been transported through conventional processes and equipment by employing moving air streams.

METHOD AND APPARATUS FOR DELIVERING PARTICULATE MATERIAL TO AN AIR STREAM

FIELD OF THE INVENTION

The present invention relates to a technique for delivering particulate material to a gas stream. More particularly, the invention can relate to a method and apparatus for delivering particulate superabsorbent material into a moving air stream which transports the particulate material to a selected location.

BACKGROUND OF THE INVENTION

Conventional production techniques have directed measured amounts of particulate material into a moving air stream to transport the particulate material through various processes and equipment. For example, absorbent articles and structures, such as absorbent pads and absorbent cores, have been formed by employing various techniques, such as wet forming techniques, and air laying techniques. Additionally, selected amounts of superabsorbent particles have been transported through conventional processes and equipment by employing moving air streams.

Conventional airlaying techniques have, for example, have employed a conveying air stream to transport particulate material from a supply reservoir, through a transport conduit and into a forming chamber. The moving air stream has been employed to inject the selected particles into the forming chamber. A foraminous forming surface, such as a forming screen, has been transported through the forming chamber, and fibrous materials, such as fibers of absorbent cellulose, have also been introduced into the forming chamber. Additionally, a vacuum source has been employed to draw a formation air flow through the forming surface. The formation air flow entrains the fibers and particulate material for deposition onto the moving forming surface. In particular systems, a nozzle has been employed to deliver and direct the particulate material into the forming chamber, and the particles have been composed of superabsorbent material.

Such conventional techniques, however, have not been sufficiently able to reliably and consistently deliver desired amounts of the particulate material into the appointed stream of moving gas for further transport. For example, particular production arrangements have desired a substantially continuous delivery of particles into a moving air stream, and the conventional delivery techniques have provided an excessive variation in the amount of particles being delivered into the moving air stream. The amount of particles being transported at a particular time has experienced undesired perturbations, and within a series of final manufactured articles, there have been undesired changes in the amount of the particulate material contained in each article. The variations in the amounts of delivered particles have worsened when the speed of the moving, transport air stream has been increased to deliver the particulate material at higher rates. As a result, there has been a continued need for improved methods and apparatus which can more reliably and more consistently deliver the particulate material into the moving gas stream.

BRIEF DESCRIPTION OF THE INVENTION

The present invention provides a distinctive method and apparatus for directing particulate material into a moving gas stream. Generally stated, the process of the invention includes a delivering of the particulate material from a particulate reservoir along a delivery direction into a housing having a housing axis. A housing gas flow is introduced into the housing through at least one entry gas port that has been provided in the housing. The housing gas flow is arranged to combine with the particulate material that is delivered from the particulate reservoir. In a particular aspect, a swirling motion can be imparted to the housing gas flow, and the swirling motion can have at least a rotational component of movement which is directed substantially circumferentially about the housing axis.

The apparatus of the invention can include a housing having a housing axis, and an inlet conduit for delivering the particulate material from a particulate reservoir along a delivery direction into the housing. The housing has at least one gas entry port for introducing a housing gas flow into the housing. The housing gas flow is arranged to combine with the articulate material that is delivered from the particulate reservoir, and in a particular aspect, the at least one gas entry port can be configured to impart a swirling motion to the housing gas flow. The swirling motion can have at least a rotational component of movement which is directed substantially circumferentially about the housing axis.

In another aspect, the apparatus and process of the invention can further include a regulating of a rate of delivery of the particulate material from the particulate reservoir. In a further aspect, the apparatus and process can include a measuring of a weight of particulate material which is delivered from the particulate reservoir. Still another aspect of the apparatus and process can include an incorporating of a plurality of entry ports into the housing. In still other aspects, the entry ports can be provided by a plurality of control vanes or louvers. Desirably, the louvers can be configured in an array which is distributed around the housing axis, and in particular aspects, the control louvers can be arranged with a selected deflection angle.

In its various aspects and configurations, the present invention can advantageously provide an effective and cost efficient technique for forming a desired distribution or concentration of particulate and fibrous material within an absorbent article. The technique of the invention can, for example, provide a more reliable and more consistent delivery of desired amounts of particulate material into the appointed stream of moving gas for further transport. In particular aspects, the technique of the invention can substantially continuously delivery the particles into the moving air stream without excessive variation, and the amount of particles being transported in the moving gas stream at a particular time can have fewer undesired perturbations. The invention can be less susceptible to an undesired clumping of the particulate material. Additionally, the technique of the invention can reduce turbulence within the delivery system, and can reduce an undesired percolating of the particles. Within a series of final articles that have been manufactured by employing the technique of the invention, there can be fewer undesired changes in the amount of the particulate material contained in each article. As a result, the technique of the invention can better produce an absorbent article having improved absorbent performance, and can better produce an article having an improved combination of liquid uptake, liquid distribution, absorbent capacity, and leakage resistance.

BRIEF DESCRIPTION OF THE DRAWINGS

The present invention will be more fully understood and further advantages will become apparent when reference is made to the following detailed description of the invention and the drawings, in which:

FIG. 8 representatively shows a schematic, top view of a strip of material that has been cut to allow the formation of a plurality of louvers;

FIG. 8A representatively shows an enlarged top view of a portion of the strip of material illustrated in FIG. 8;

FIG. 8B representatively shows a schematic, top view of a housing wherein the strip of material illustrated in FIG. 8 has been curved and configured to form a member that provides a side wall, periphery of the housing;

FIG. 8C representatively shows a schematic view of an individual louver that includes notched regions for positioning and retaining a heater coil;

FIG. 8D representatively shows a schematic view of an individual louver that includes necked-down, locking notches for securing the heater coil in position;

DETAILED DESCRIPTION OF THE INVENTION

The present disclosure of the invention will be expressed in terms of its various components, elements, constructions, configurations, arrangements and other features that may also be individually or collectively be referenced by the term, "aspect(s)" of the invention, or other similar terms. It is contemplated that the various configurations of the disclosed invention may incorporate one or more of its various features and aspects, and that such features and aspects may be employed in any desired, operative combination thereof.

It should also be noted that, when employed in the present disclosure, the terms "comprises", "comprising" and other derivatives from the root term "comprise" are intended to be open-ended terms that specify the presence of any stated features, elements, integers, steps, or components, but do not preclude the presence or addition of one or more other features, elements, integers, steps, components, or groups thereof.

The invention can be employed to form absorbent structures employed in personal care products, such as infant diapers, feminine care products, children's training pants, adult incontinence products and the like. In particular configurations, the invention can be employed in an airlaying system or other dry-forming system to produce an fibrous absorbent web that can be employed in such absorbent structures. The invention can alternatively be incorporated into other types of forming systems, such as a wet-laying system, a foam-forming system or other wet-forming system. Optionally, the technique of the invention can be employed with combinations of such forming systems.

Figure 1:
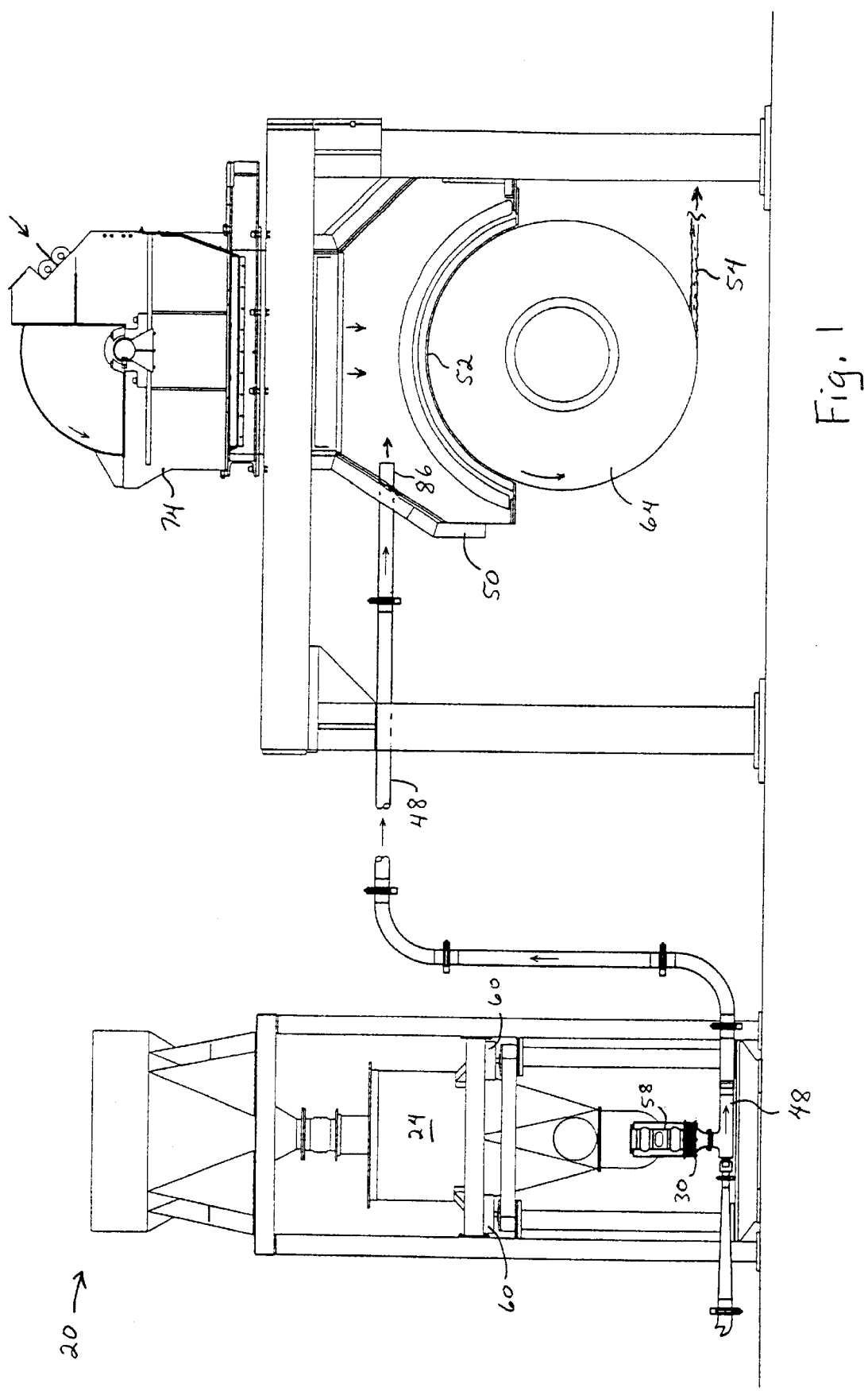
FIG. 1 representatively shows a schematic, side view of a forming system which incorporates an intake housing of the invention.
Figure 3:
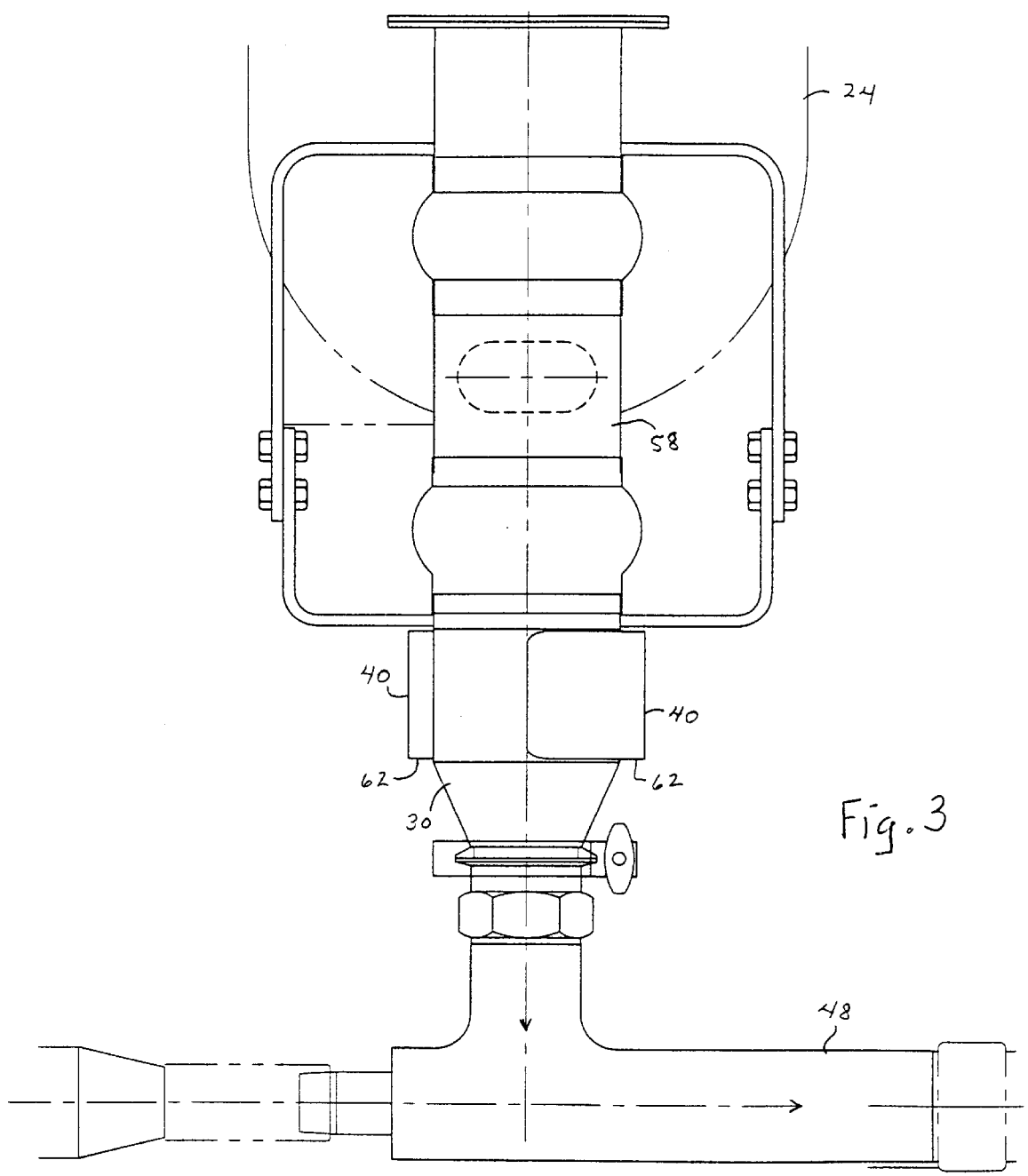
FIG. 3 representatively shows a schematic, side view of a system which includes a housing having a pair of intake openings, each of which is arranged to provide a swirling motion to the housing gas flow.
Figure 3A:
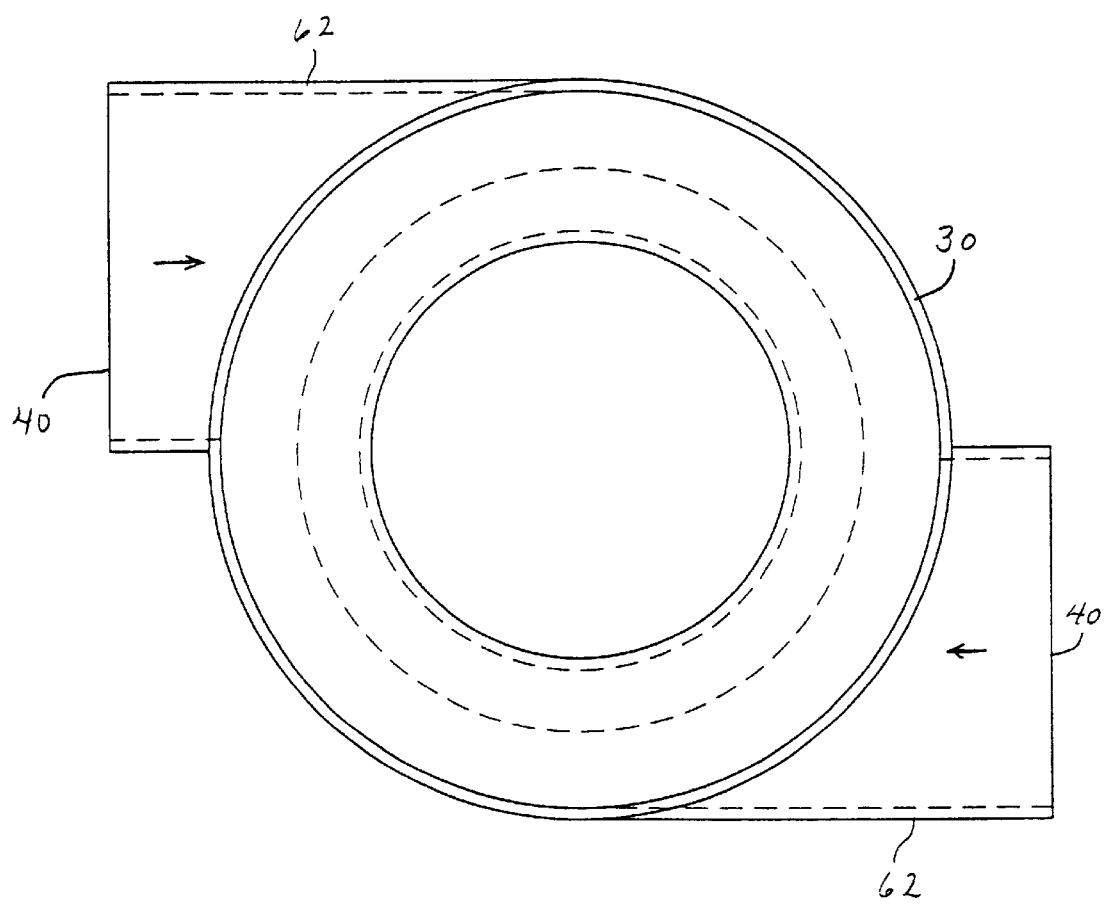
FIG. 3A representatively shows a schematic, top view of the housing illustrated in FIG. 3.
Figure 3B:
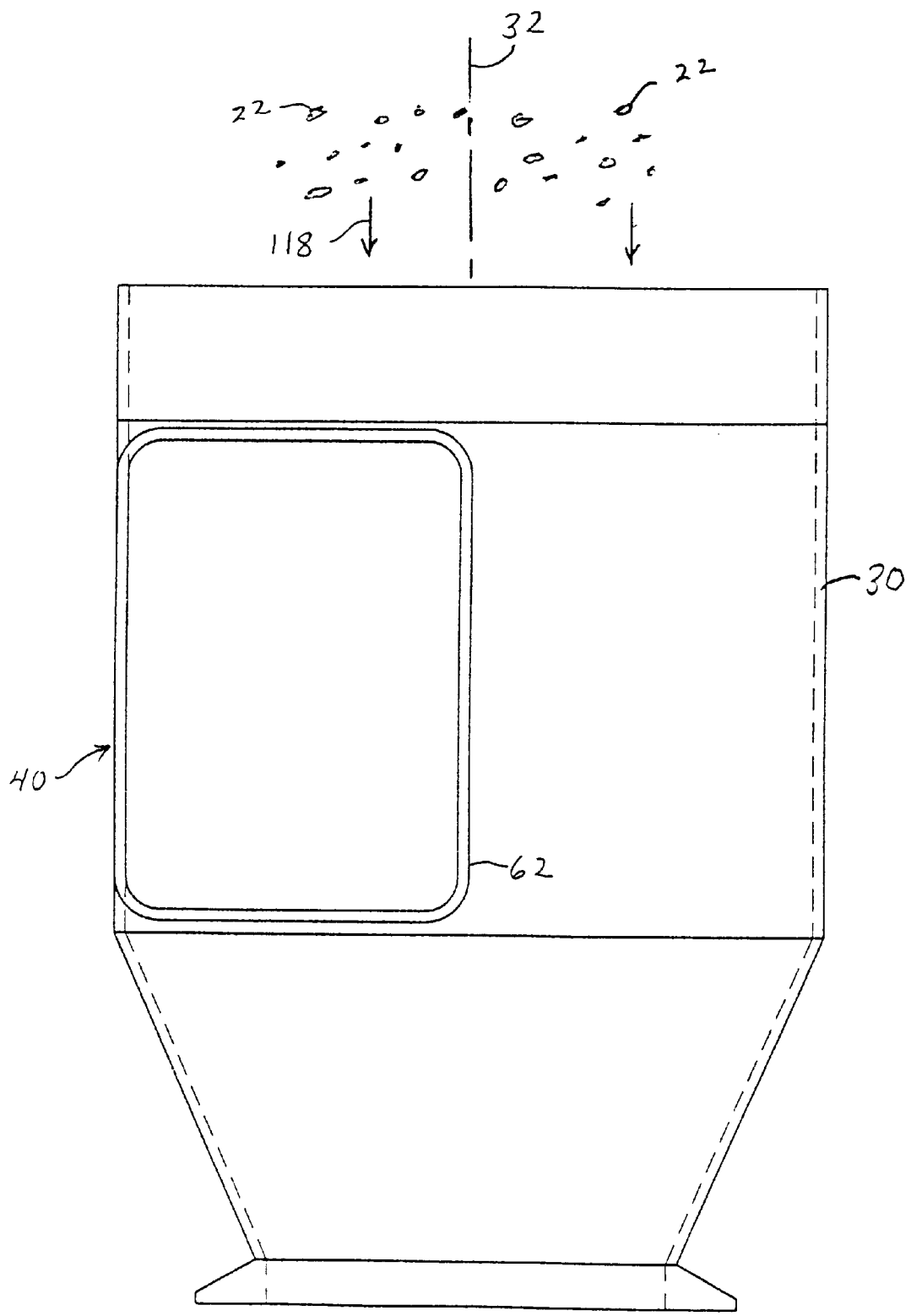
FIG. 3B representatively shows a schematic, end view of the housing illustrated in FIG. 3.

With reference to FIGS. 1, and 3 through 3B, the technique of the invention can provide a distinctive method and apparatus 20 for directing particulate material 22 into a moving gas stream. The method or process of the invention can include a delivering of the particulate material 22 from a particulate reservoir 24 along a delivery direction 118 into an intake housing 30 having a housing axis 32. A housing gas flow is introduced into the housing 30 through at least one entry gas port 40 that has been provided in the housing 30. The housing gas flow is arranged to combine with the particulate material 22 that is delivered from the particulate reservoir 24. A swirling motion can be imparted to the housing gas flow, and the swirling motion can have at least a rotational component 110 of movement (e.g. FIG. 10A) which is directed substantially circumferentially about the housing axis 32. Desirably, the swirling motion has at least a major component of movement that is configured to be in the rotational directional about the housing axis.

The apparatus of the invention can include a housing 30 having a housing axis 32, and an inlet conduit 28 which delivers the particulate material 22 from a particulate reservoir 24 along a delivery direction 118 into the housing 30. The housing 30 has at least one gas entry port 40 for introducing a housing gas flow into the housing. The housing gas flow is arranged to combine with the particulate material 22 that is delivered from the particulate reservoir 24, and the at least one gas entry port 40 can be configured to impart a swirling motion to the housing gas flow. The swirling motion can have at least a rotational component 110 of movement which is directed substantially circumferentially about the housing axis 32.

Figure 4:
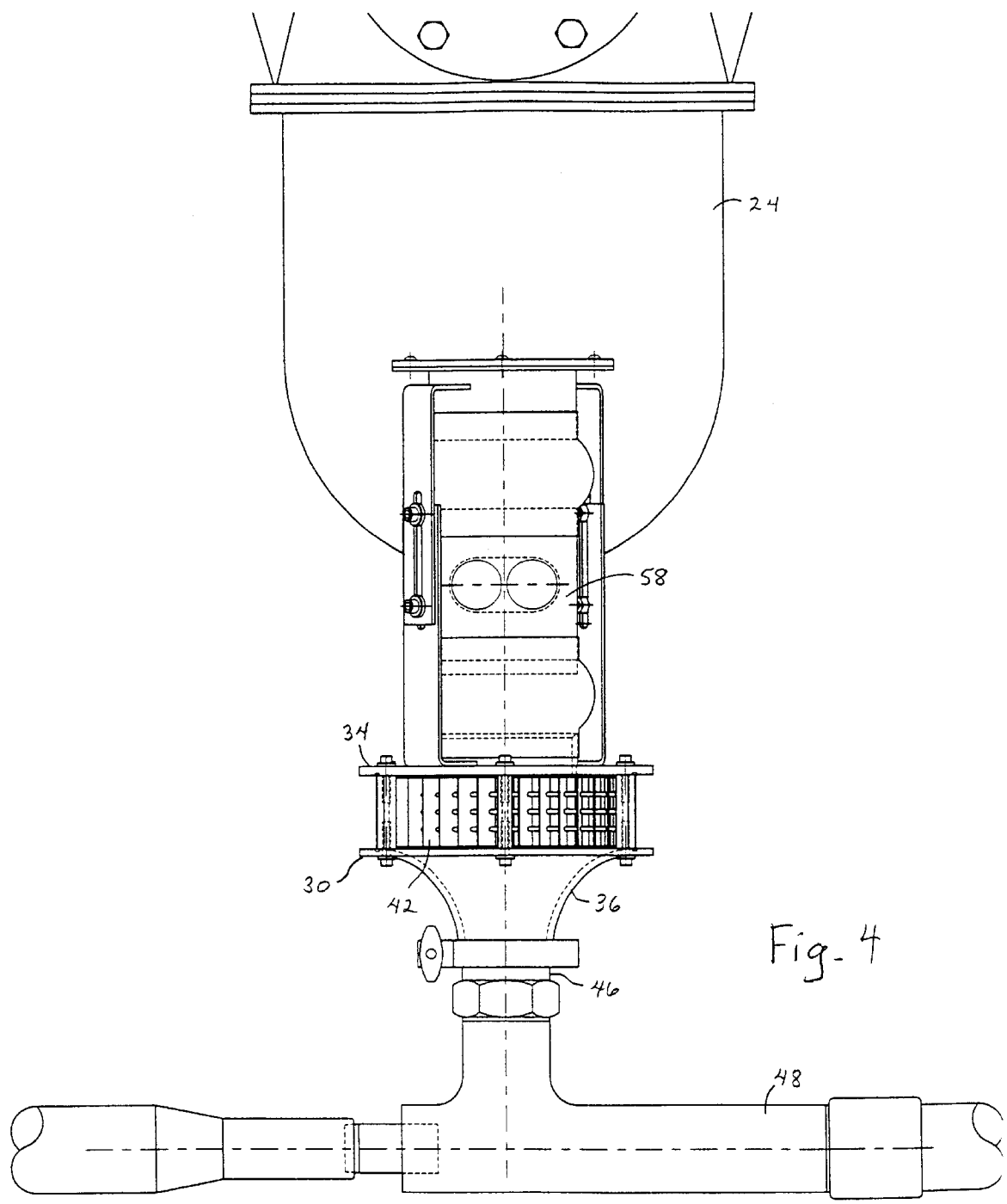
FIG. 4 representatively shows a schematic, side view of a system which includes a housing having a plurality of intake openings and a plurality of louvers which are arranged to provide a swirling motion to the housing gas flow.

In a particular aspect, the apparatus and process of the invention can further include a regulating of a rate of delivery of the particulate material 22 from the particulate reservoir 24. In another aspect, the apparatus and process can include a measuring of a weight of particulate material which is delivered from the particulate reservoir 24. A further aspect of the apparatus and process can include an incorporating a plurality of entry ports 40 into the housing 30. In another aspect, a plurality of control vanes or louvers 42 can be operatively configured and arranged to provide the plurality of entry ports (e.g. FIGS. 4 and 4A). Desirably, the louvers can be configured in an array which is distributed around the housing axis 32. In particular aspects, the entry ports 40 can be operatively arranged with a selected deflection angle. For example, the control louvers 42 can be configured and aligned to provide the selected deflection angle. Still another feature of the apparatus and process of the invention can include a delivering of the moving gas stream and particulate material to a selected web-forming operation. For example, the forming operation can include a forming chamber 50, and within the forming chamber 50, the particulate material 22 can be combined with fibers of a selected absorbent material, such as woodpulp fibers. Additionally, the method and apparatus of the invention can include an operative distributing of the particulate material and fibrous material onto a foraminous forming surface 52 that is operatively moved through the forming chamber. For example, the distributing of the particulate material and fibrous material can employ an airlaying technique, a wet-laying technique, a foam-Forming technique or the like, as well as combinations thereof.

The technique of the invention can be employed with any suitable particulate material. For example, the particles may be composed of a liquid-absorbent material, odor absorbent material, binder material, strengthening material, diagnostic material, cosmetic material, health-treatment material or the like, as well as combinations thereof. For example, the particles may be composed of polymer pellets, odor control powders or pellets, binder fibers or particles, superabsorbent fibers, or reclaimed absorbent fibers or particles. In desired arrangements, the particulate material can include particles of a superabsorbent polymer material. Examples of such superabsorbent materials are DOW 2035 material available from Dow Chemical, a business having offices located in Midland, Mich., U.S.A.; and FAVOR 850 material available from Stockhausen, a business having offices located in Krefeld, Germany; and HYSORB 7050 material available from BASF, a business having offices located in Ludwigshafen, Germany.

It is contemplated that any operative gaseous medium may be employed to provide the various gas flows and/or gas streams set forth in the present disclosure. For example, the various configurations of the invention may employ ambient air as the operating gas.

Figure 2:
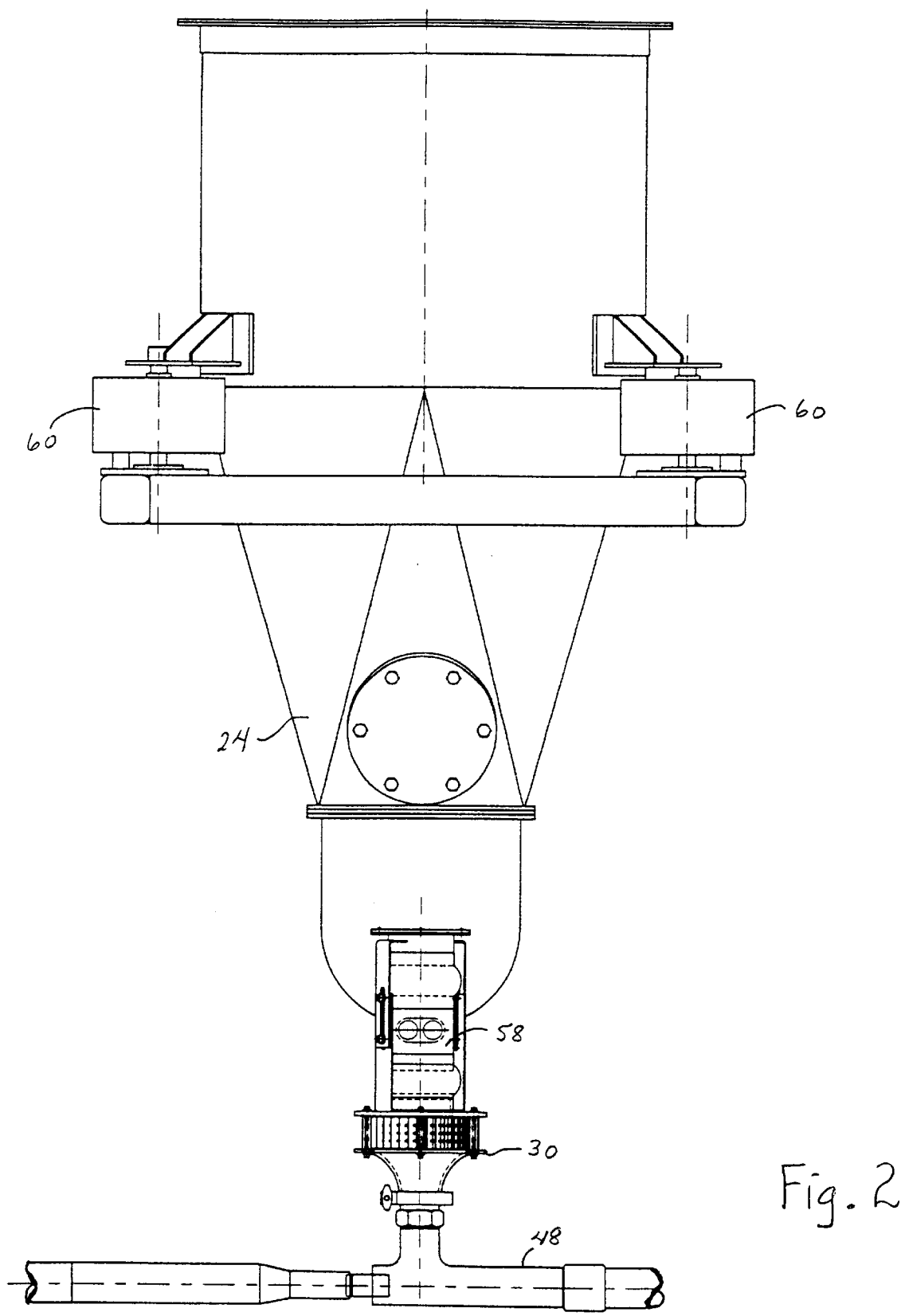
FIG. 2 representatively shows a schematic, side view of a system which includes a a,housing having a multiplicity of intake openings.

With reference to FIGS. 1 through 3, the process and apparatus can include an operative delivery or feed mechanism, such as a representatively shown screw feed mechanism 58. The delivery mechanism can be configured to selectively regulate a desired rate of delivery of the particulate material 22 from the particulate reservoir 24 into the inlet conduit 28. Various delivery systems may be employed. For example, the delivery system may include a K-TRON T35 particle delivery system with a screw feed mechanism available from K-TRON America, a business having offices located in Pitman, N.J. Alternatively, a substantially equivalent device may be employed. Alternatively, the technique of the invention may include other types of conventional feed mechanisms that are well known in the art. Such feed mechanisms can include, for example, a barrel feeder, a vibratory feeder or the like, as well as combinations thereof. A barrel feeder can, for example, provide a gravity feed of particulate material from a reservoir into predetermined-sized recesses formed into the outer surface of a cylinder, and the cylinder can be rotated to dispense the particles. Such systems are available from Christy Machine Company, a business having offices in Fremont, Ohio. A vibratory feeder can, for example, dispense particulate material by gravity feed onto a vibratory feed tray, and the vibrating tray mechanism can be configured to regulate the rate of delivery of the particles. Such systems are available from Osprey Corporation, a business having offices located in Atlanta, Ga.

In another aspect, the technique of the invention can include a weighing system or mechanism 60 for measuring a weight of particulate material 22 which is delivered from the particulate reservoir 24. For example, the weighing system may include a K-TRON K10S, weight-in-loss controller and Model SFT II load cells. Such a system is available from K-TRON America. The technique of the invention may alternatively employ other substantially equivalent systems.

In desired arrangements, the particulate material can be delivered from said particulate reservoir at a rate which at least a minimum of about 1 Kg/min . The delivery rate can alternatively be at least about 1.5 Kg/min , and optionally, can be at least about 2 Kg/min to provide improved performance. In other aspects, the particulate delivery rate can be up to about 25 Kg/min, or more. The delivery rate can alternatively be up to about 20 Kg/min, and optionally, can be up to about 15 Kg/min to provide improved effectiveness. The various advantages of the invention can be particularly apparent when the particulate delivery rate is at least about 8 Kg/min, and can be more apparent when the particulate delivery rate is at least about 10 Kg/min.

In various arrangements of manufacturing equipment and processes, it has been desirable to increase the weight-amount of particulate material being conveyed by the moving gas stream. For example, in the production of absorbent articles, it has been desirable to incorporate larger amounts of superabsorbent particles within each individual article. Accordingly, the speed of the moving stream of transport gas has been increased to raise the mass-rate of transport of the particles. The increased, gas flow rate, however, has induced a significant level of vacuum within the delivery mechanism employed to feed the controlled amounts of particles into the moving gas flow, and the vacuum generated in the delivery mechanism has disrupted the desired rate of delivery of particles from the supply reservoir. For example, the vacuum level can be approximately −0.6 inches of water, or more. In other situations, the vacuum can increase (have a greater negative value) to a level of approximately −1.5 inches of water, or more.

To eliminate or reduce the vacuum, a supplemental gas flow has been operatively combined with the delivery mechanism. For example, some arrangements have introduced the supplemental gas flow at a location that is relatively upstream from the delivery or feed mechanism. These arrangements have generated an inconsistent flow of particulate material into the gas stream moving through the transport or eductor conduit 48. As a result, there can be an inconsistent flow of particles into subsequent processing operations and equipment, such as provided by the forming chamber 50. Other arrangements have introduced the supplemental gas flow at a location that is relatively downstream from the delivery or feed mechanism. Typically, the arrangements have employed one or more air intake tubes that introduced airflow through the sides of a conduit that directed the particles into the moving stream of transport gas. Such arrangements, however, have generated excessive turbulence, and have caused an excessive build-up of particles in low-flow areas of the system. The accumulated particles can undesirably slough off at unpredictable, random times. As a result, such conventional systems still generated an excessively variable flow-rate of particulate material into the transport gas stream moving through the conduit 48. Consequently, the flow-rate of particulate material carried through the conduit by the transport gas stream has also been excessively variable.

To address the problems of conventional systems, the technique of the invention can incorporate a housing 30, and a supplemental, housing gas flow can be introduced into the housing 30 through at least one entry gas port 40, as illustrated in the various representatively shown configurations. The at least one entry gas port 40 is arranged to impart a swirling motion to the housing gas flow. The swirling motion provided by the various configurations of the method and apparatus of the invention has at least a rotational component 110 of movement (e.g. FIG. 10A ) which is directed in a substantially circumferential direction within the housing. Additionally, the housing gas flow can be provided with a radial component of movement or motion 114, which is directed substantially radially inward toward the housing axis 32. The housing gas flow can further be provided with an axial component of movement or motion which is aligned substantially parallel to the housing axis along and can be directed along the housing axis. The rotational component of movement 110 may be configured to be in a clockwise or counter-clockwise direction to operate with or against the local Coriolis effect, as desired.

In a particular configuration, the invention can include at least one pair of opposing, intake conduits, such as the intake tubes 62 representatively shown in FIGS. 3 through 3B. The dual intake tubes can advantageously be configured to generate a substantially tangential, or spiral motion to the housing gas flow. In particular aspects, the intake tubes can be angled, skewed or otherwise offset to direct their airflows away from the housing axis 32. The selected arrangement can help reduce turbulence inside the housing by preventing the "crash" of opposing air streams. Instead of entering the housing along paths that directly opposed each other, the incoming air streams would be directed along generally spiral paths to induce a cyclonic effect, which would swirl the air and the particulate material down a suitable conduit into the eductor 48 in a more consistent manner. The resulting arrangement could reduce the level of induced vacuum, reduce turbulence and provide a more consistent feeding of the particles. Since the combined, total air intake area of the intake tubes 62 may be limited, however, there can be a need to reconfigure the system to further reduce the amount of vacuum generated at the delivery or feed mechanism.

To provide the further improvement, the technique of the invention can be configured to include a greater number of intake conduits, such as a larger number of intake tubes 62 to provide another tangential, multiple spiral tube intake arrangement more than two intake tubes. This configuration could give all the benefits of the spiral dual-tube design, but could also increase the total intake area. As a result, the arrangement can provide a greater decrease the level of vacuum at the feed mechanism, and can provide a greater decrease of the air speeds in the individual intake tubes 62 to further decrease turbulence. Additionally, the design can better surround the falling particles with swirling air and decrease the occurrence of undesired build-up of particles in the housing.

As representatively shown in FIGS. 4 through 5A, a further aspect of the invention can be configured to employ an inlet area that extends along substantially the entire perimeter of the housing 30 for taking in the supplemental, housing gas flow. This larger, total intake area can advantageously reduce the level of vacuum at the feed mechanism 58, and can reduce the velocity of the incoming housing gas flow. For example, the speed of the housing gas flow can be not more than a maximum of about 300 m/min to provide reduced turbulence in the housing. The speed of the housing gas flow can alternatively be not more than about 200 m/min, and optionally, can be not more than about 130 m/min to provide improved performance.

In desired configurations, for example, a multiplicity of vanes or louvers 42 can be employed to induce the desired cyclonic effect. These louvers allow the air stream to be guided into a swirl with reduced disturbance and reduced turbulence. The housing 30 can include a distinctively shaped bottom wall member 36. In a particular aspect, the housing can have a substantially funnel-shaped bottom member which provides a smoother, more aerodynamic shape. The shape can minimize disturbances in the housing gas flow, and can provide a smoother guide for more effectively directing the particulate material to the eductor, transport conduit 48. The inner surface angles and curvatures of the bottom member can contribute to a combination of features, such as a large intake area, a smooth transitional surface from a generally horizontal surface at the perimeter of the bottom wall to a generally vertical surface at the lower throat of the bottom wall. Additionally, the configuration of the housing and the bottom member can provide 45° or smaller angle of incidence between the wall of the funnel and the vertical direction of the falling particles at the projected perimeter of the outlet conduit from the housing. The features can be provided within a limited separation distance between the feed mechanism 58 and the eductor transport conduit 48. The smoothness, the lack of abrupt edges, and the lack of sharp changes in direction of the incoming air can cooperate to spread the airflow more evenly over the surface of the housing bottom member. These features can also help to reduce the places in which the particles might build-up and slough off. The funnel shape of the housing bottom can also allow air to be introduced along a direction that is generally parallel to the surface of the bottom member, and can gently guide the from all sides equally to be parallel to the direction of flow of the selected superabsorbent material (SAM). A substantially transparent top cover or wall member 34 for the housing 30, such as a top member composed of a transparent LEXAN polycarbonate material, can be employed to allow an easy inspection of the internal workings of the housing.

As representatively shown, the housing 30 can include the top wall member 34 and the bottom wall member 36, and the top and bottom members can have any operative shape. In the representatively shown configuration, for example, the top member 34 can have a substantially circular disc shape. Additionally, the housing 30 can be provided with a substantially cylindrical shape along its radially outboard, side periphery 38. In alternative configurations, however, the side periphery of the housing may be non-cylindrical. For example, the outline shapes of the top member 34 and/or the bottom member 36 around the housing axis 32 may be oval, rectilinear, polygonal or the like, as well as combinations thereof. Additionally, the outboard surface-outline of the housing side periphery may taper or otherwise vary as one observes the surface-outline moving from top member 34 to the bottom member 36.

As representatively shown, the housing 30 can also include an inlet conduit 28 and an outlet conduit 46. In desired configurations, the inlet conduit 28 can be substantially aligned with the housing axis 32, and can have a substantially circular cross-section. In another aspect, the housing outlet conduit 46 can be substantially aligned with the housing axis 32, and can have a substantially circular cross-section. The inlet conduit is operatively connected in communication with the selected delivery mechanism for the particulate material, and the outlet conduit is operatively connected in communication with the transport conduit 48 that carries the selected moving gas stream. In particular arrangements, for example, the outlet conduit can have a generally circular cross-section with an inside diameter of about 6.4 cm (about 2.5 inch), and the transport conduit can have a generally circular cross-section with an inside diameter of about 7.6 cm (about 3 inch). In optional arrangements, the cross-sectional shapes of the inlet conduit, outlet conduit and/or transport conduit can be non-circular. For example, the cross-sectional shapes can be oval, rectilinear, polygonal or the like, as well as combinations thereof.

The housing 30 can desirably be located relatively downstream from the delivery feed mechanism 58, as illustrated in the representatively shown arrangement. The relatively downstream arrangement can help to reduce turbulence past the feed mechanism, and can help provide a more consistent delivery of particulate material through the system.

Figure 12:
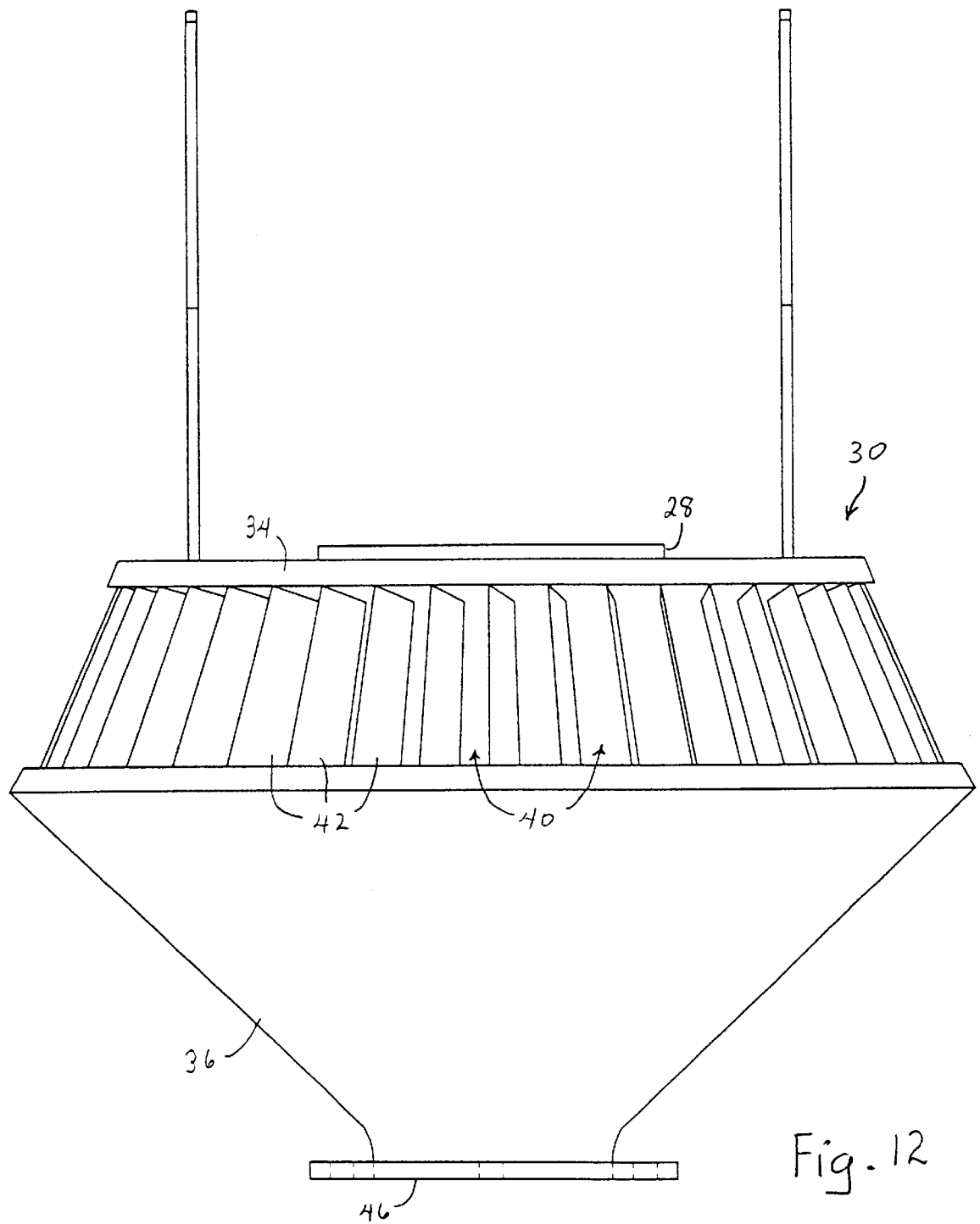
FIG. 12 representatively shows a schematic, side view of an intake housing having a plurality of tilted louvers and a generally conically shaped bottom member.
Figure 12A:
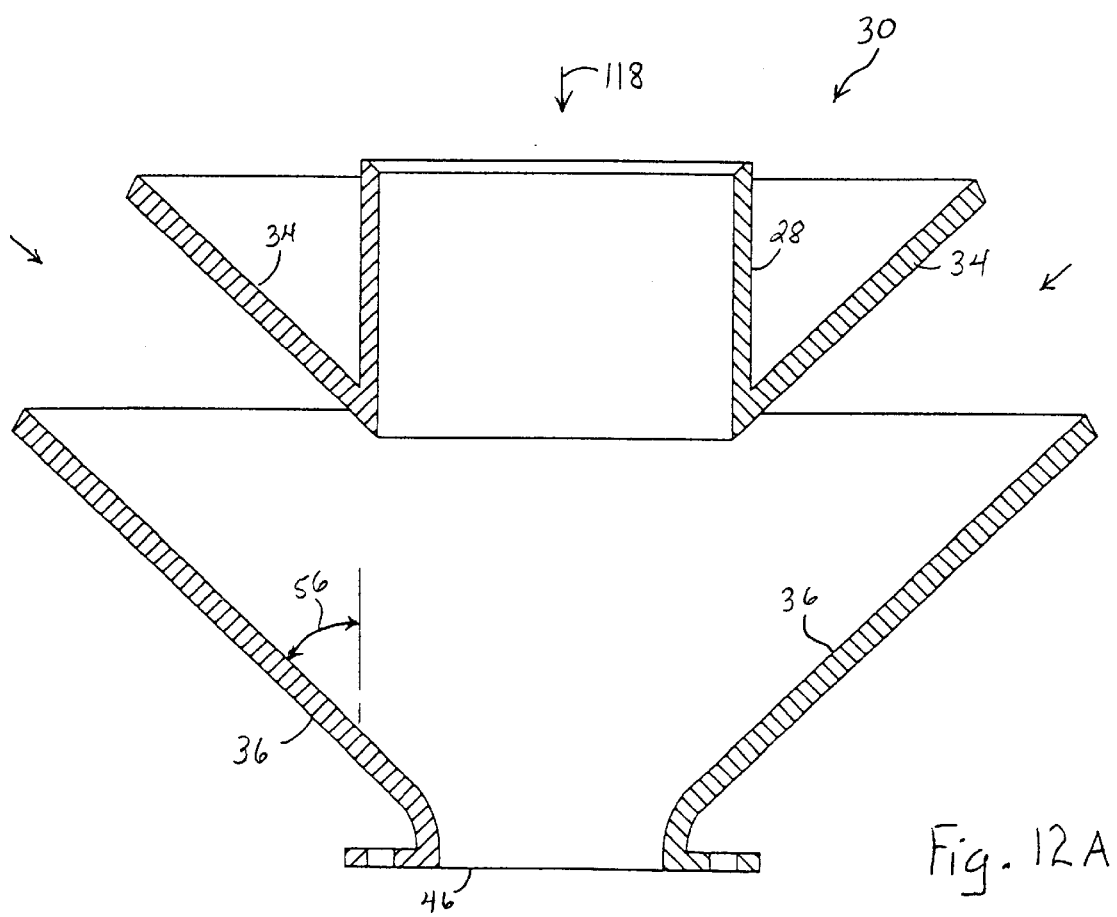
FIG. 12A representatively shows a schematic, cross-sectional view of the housing illustrated in FIG. 12, where the louvers have been removed for clarity.

In a particular feature, the housing bottom member 36 can be provided with a generally conical shape. In desired configurations, the generally conical-shape of the bottom member 36 can have a cone angle 56 (e.g. FIG. 12A). In particular aspects, the cone angle can be at least a minimum of about 20 degrees. The cone angle can alternatively be at least about 25 degrees, and optionally, can be at least about 30 degrees to provide improved performance. In other aspects, the cone angle 56 can be not more than a maximum of about 70 degrees. The cone angle can alternatively be not more than about 60 degrees, and optionally, can be not more than about 50 degrees to provide improved effectiveness.

If the cone angle 56 is too small or too large, there can be an insufficient amount of the supplemental airflow, and an excessive clogging of the particle flow. Additionally, there can be excessive vacuum generated at the feed mechanism and excessive turbulence generated in the housing 30.

In another feature, the housing bottom member 36 can be provided with a flared, substantially trumpet-shape. Accordingly the bottom member 36 can incorporate a graduated system of changing cone angles as one observes the surface of the bottom member moving from the outer, side periphery 38 of the housing to the outlet conduit 46. The local, tangential cone angle at the largest diameter "mouth" of the trumpet-shape can be relatively wide and flat; and the local, tangential cone angle at the smallest diameter "throat" of the trumpet-shape can be relatively narrow and steep. The trumpet-shape of the housing bottom member can help guide the particulate material into the outlet conduit with greater consistency and less variation.

Typically, a portion of the bottom member is axially aligned (along the direction of the housing axis 32) with the perimeter of the inlet conduit 28. Where the inlet conduit is circular in cross-section, the aligned portion of the bottom member is also circular in shape. With respect to a local line that is drawn tangent to the surface of aligned portion of the bottom member and arranged to intersect the housing axis 32, the intersect angle 98 is desirably not more than about 60°, as representatively shown in FIG. 6. To provide improved performance the intersect angle can alternatively be not more than about 50°, and can optionally be not more than about 45°. Such intersect angles can more effectively direct the particulate material into the housing outlet conduit 46, and can, for example, help to avoid a bouncing of the particles out from the gas entry ports of the housing.

With reference to FIGS. 4 through 5A, the housing 30 can include a plurality of entry ports 40 that have been provided in the housing. Accordingly, the housing gas flow can be introduced into the housing 30 through the plurality of entry ports 40. The entry ports 40 can be configured to provide a total gas entry area which is at least a minimum of about 20 $cm^2$. The total gas entry area can alternatively be at least about 30 $cm^2$, and optionally, can be at least about 40 $cm^2$ to provide improved performance. In other aspects, the total gas entry area can be not more than a maximum of about 500 $cm^2$. The total gas entry area can alternatively be not more than about 200 $cm^2$, and optionally, can be not more than about 100 $cm^2$ to provide improved effectiveness.

If the total gas entry area is too small, there can be an excessive vacuum in the feed mechanism 58. As a result, the vacuum will tend to draw particles out of the feed mechanism in a relatively unpredictable manner, and interfere with the desired, precision metering operation of the feed device. If the total gas entry area is too large, the speed of the supplemental airflow into the housing may be insufficient to provide an operative "scouring" effect within the housing 30. Additionally, the cost and space requirements may become excessive.

In a particular aspect, a plurality of control louvers 42 can be incorporated into the housing to thereby provide the plurality of housing entry ports 40. The control louvers 42 can be configured in a selected array which is operatively distributed around the housing axis. For example, the control louvers 42 can be distributed in a substantially circular array around the housing axis 32.

The control louvers 42 can have any operative shape, such as oval, curved, rectilinear or the like, as well as combinations thereof. For example, the louvers 42 can have a generally rectangular shape, with a top edge portion and a bottom edge portion. The top edge portion is located proximate the housing top member 34, and the bottom edge portion is located proximate the housing bottom member 36. Additionally, each control louver 42 can have a selected louver height 90, a selected louver width 92, a substantially fixed edge region, as representatively shown in FIGS. 8 through 8D. Any conventional technique may be employed to provide the desired louvers 42. For example, the louvers may be provided by separated provided plate members that are operatively mounted on one or more supporting members employing arrangements and structures that are well known in the art. The supporting members can be any operative shape, as needed or convenient for providing a cooperative assembly into the housing 30.

In a particular configuration, a strip 70 of suitable material, such as a strip of plastic or metal, may be cut to form individual louver regions and to form any desired notches in the louvers. Each individual louver region can be bent, deformed or otherwise pivoted along its corresponding, appointed fixed edge region 66 to displace its appointed distal edge regions 68 away from the plane generally defined by the strip 70. The individual distal edge regions can be displaced to provide the desired louver angles 44. Additionally, the strip material 70 can be formed into a desired shape, such as the illustrated ring-shape, for incorporation into the housing 30 between the top member 34 and the bottom member 36. As representatively shown, the strip can help form the side periphery 38 of the housing.

In a desired aspect, the louver height 90 can be at least a minimum of about 0.5 cm. The louver height can alternatively be at least about 0.75 cm, and optionally, can be at least about 1 cm to provide improved performance. In other aspects, the louver height can be not more than a maximum of about 10 cm. The louver height can alternatively be not more than about 5 cm, and optionally, can be not more than about 3 cm to provide improved effectiveness.

If the louver height is too small, there can be excessive vacuum developed at the feed mechanism, and the housing airflow can be excessively hindered. The velocity of the housing airflow may be too high, and the housing airflow may be inadequately heated. If the louver height is too large, the manufacturing cost may become excessive. Additionally, the velocity of the housing airflow may be too low, and may lose the desired swirling motion.

In another aspect, the louver width 92 can be at least a minimum of about 0.5 cm. The louver width can alternatively be at least about 1 cm to provide improved performance. In other aspects, the louver width can be not more than a maximum of about 10 cm. The louver width can alternatively be not more than about 5 cm, and optionally, can be not more than about 3 cm to provide improved effectiveness.

If the louver width is too small, the housing airflow may not adequately maintain the desired swirling motion, and there may be an inadequate or inefficient heating of the housing airflow. If the louver width is too large, the cost and space requirements may be excessive. If the louver width is too large and extends to close to the housing axis, the desired swirling motion of the housing airflow may not be adequately maintained.

Figure 4A:
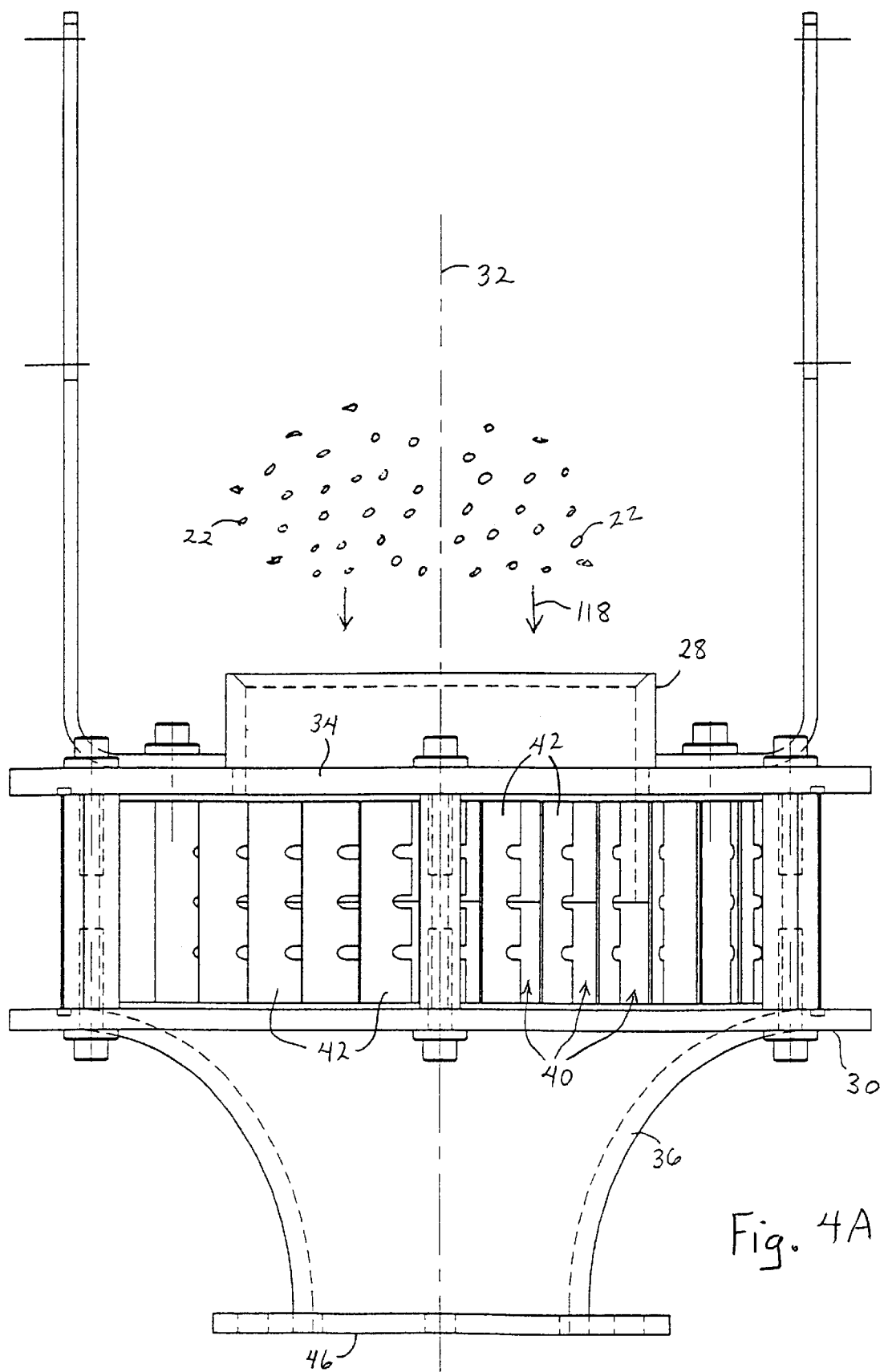
FIG. 4A representatively shows an enlarged, side view of the housing illustrated in FIG. 4.
Figure 5:
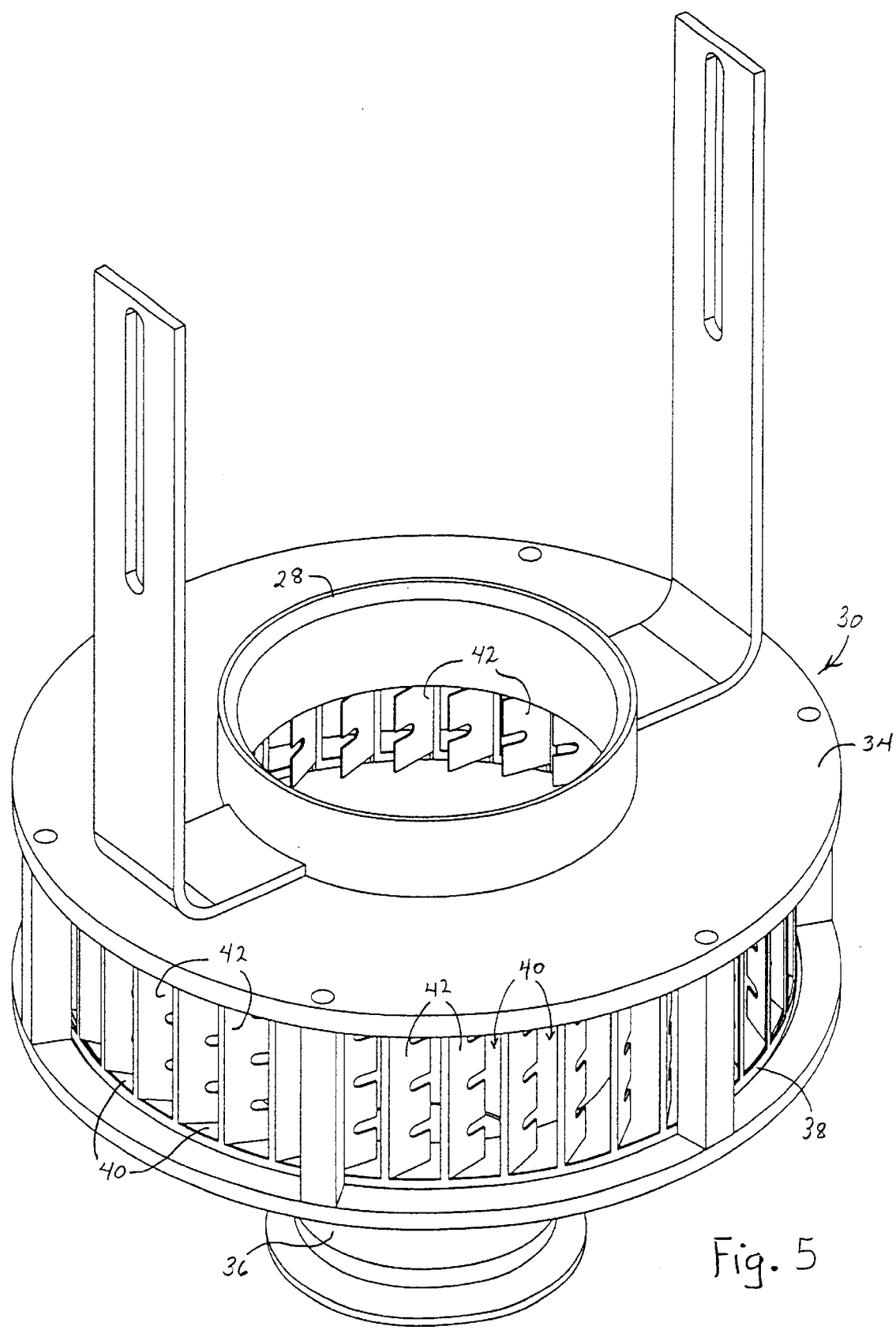
FIG. 5 representatively shows a schematic, top-side, perspective view of the housing illustrated in FIG. 4.
Figure 5A:
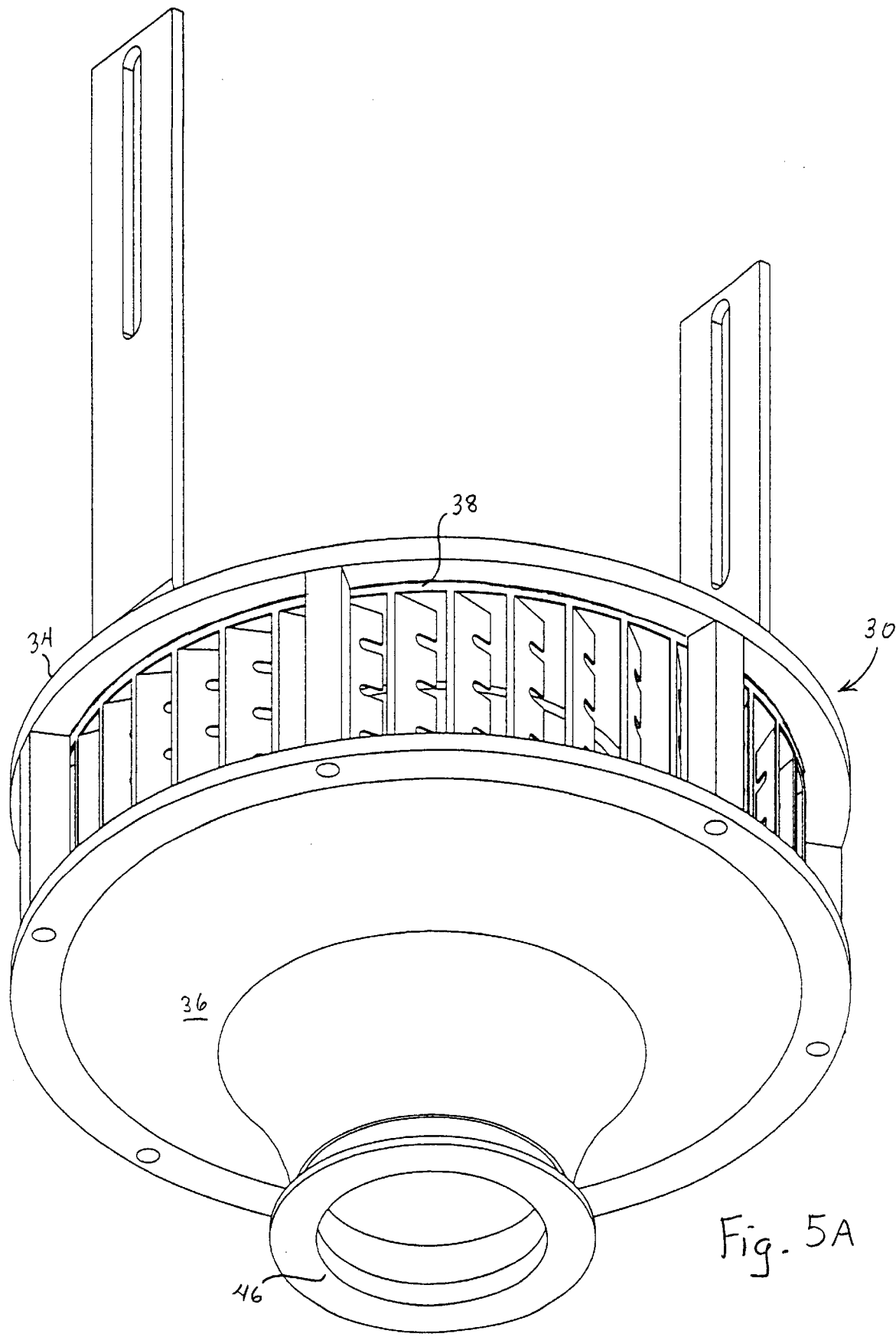
FIG. 5A representatively shows a bottom-side, perspective view of the housing illustrated in FIG. 4.

With reference to FIGS. 4A and 8B, the process and apparatus of the invention can be configured to arrange one or more of the control louvers 42 with a selected deflection angle 44. In particular aspects, the deflection angle can be at least a minimum of about 20 degrees. The deflection angle can alternatively be at least about 25 degrees, and optionally, can be at least about 30 degrees to provide improved performance. In other aspects, the deflection angle can be not more than a maximum of about 75 degrees. The deflection angle can alternatively be not more than about 65 degrees, and optionally, can be not more than about 60 degrees to provide improved effectiveness. In a desired arrangement, the louvers 42 can be set with a deflection angle of about 45°. The deflection angle is measured relative to a line that extends form the location of the individual louver and intersects at a perpendicular angle with the housing axis 32.

The deflection angle of the louvers 42 can affect the performance of the intake by creating more or less swirling. If the louvers are bent or otherwise positioned more closed with a relatively larger deflection angle, the incoming air flow can be given larger tangential component of velocity. The increased swirling can provide a scouring action, which helps keep the inside of the housing clean. If the louvers were positioned too far closed, however, the incoming air flow can be given an excessively large tangential component of velocity, and can swirl the air too aggressively. This may cause some of the particulate material to be carried away from the falling stream of particles and into the swirling air currents where it may be flung out of the housing. If the louvers are positioned to be relatively more open with a relatively smaller deflection angle, the louvers can induce less swirl, and the housing gas flow can be directed along a straighter, slower path though the housing and along the housing bottom member 36. As a result, the housing gas flow can be very even and non-turbulent. If the deflection angle is too small, however, the speed of the airflow in the housing may decrease to a level at which an excessive build-up of the particulate material may on the housing bottom member 36. For example, such build-up may occur on the top third of the inner surface of the bottom member. A desired deflection angle can be set at approximately 45° relative to a local line that is tangent to the housing, but this angle may vary depending upon the velocity of the airflow into the housing. The desired setting can conveniently be found by positioning the louvers more closed if build-up occurs, or positioning the louvers more open if particles can be observed swirling around in the top half of the housing.

An additional feature of the invention can include control louvers 42 that can be adjustable to allow a selective positioning of the louver deflection angle 44. The desired adjustability can be provided by any conventional mechanism or technique known in the art. For example, the individual louvers may be mounted on pivot shafts, and the louvers may be selectively angled, individually or collectively, by employing conventional gears, pulleys, links or the like, as well as combinations thereof. The individual louvers may be biased toward a selected position, such as a closed position, by employing any conventional mechanism, such as springs, servos, actuators or the like. The louvers can be configured to operatively open in coordination with the housing gas flow and any vacuum suction generated within the housing. For example, the louvers may be constructed from a flexible material having a selected stiffness. The stiffness can hold the louvers normally-closed, and the louvers can open due to the housing gas flow and any vacuum suction generated within the housing.

Figure 11:
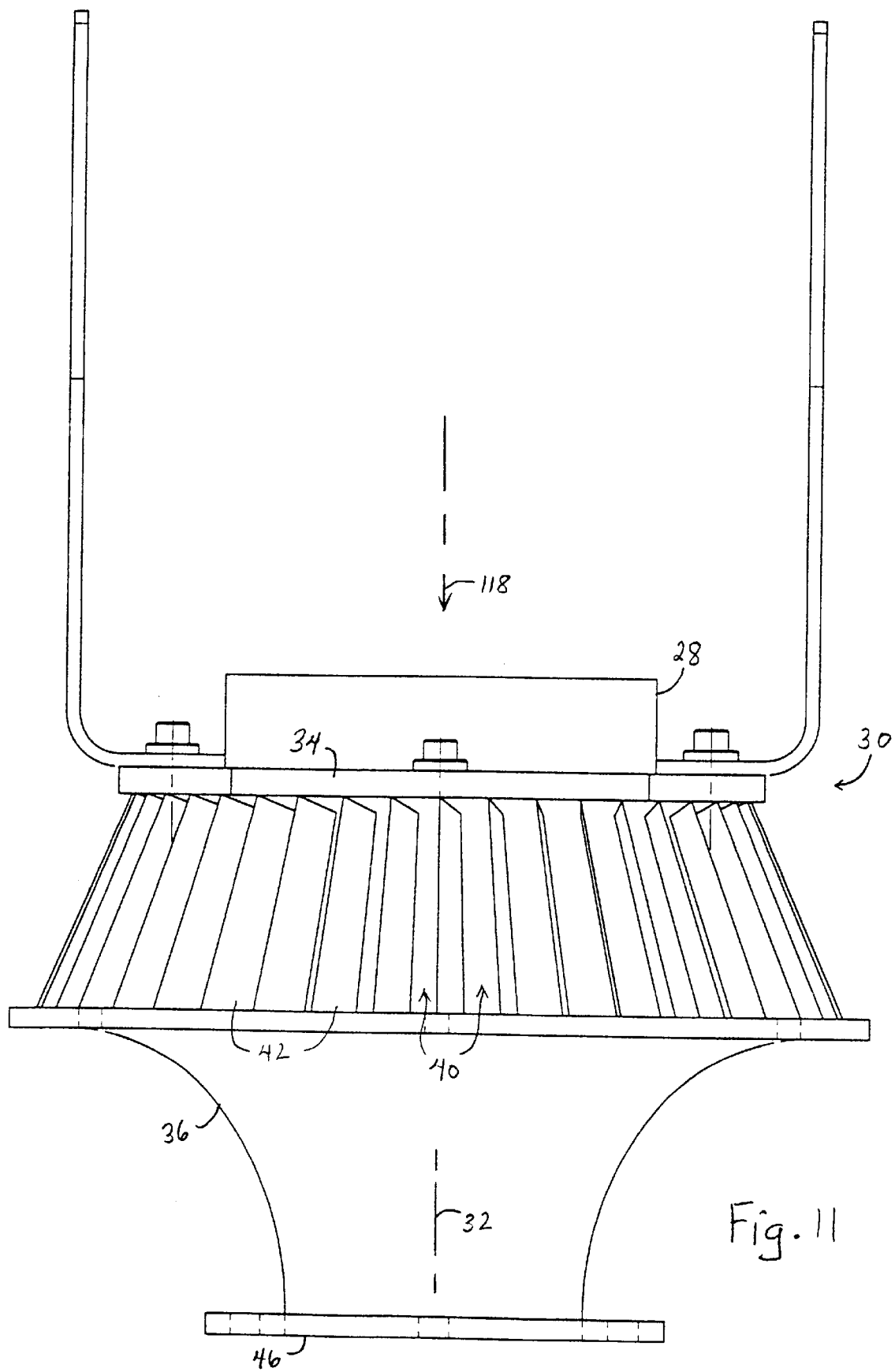
FIG. 11 representatively shows a schematic, side view of an intake housing having a plurality of louvers tilted toward the center of the housing at a selected tilt angle.
Figure 11A:
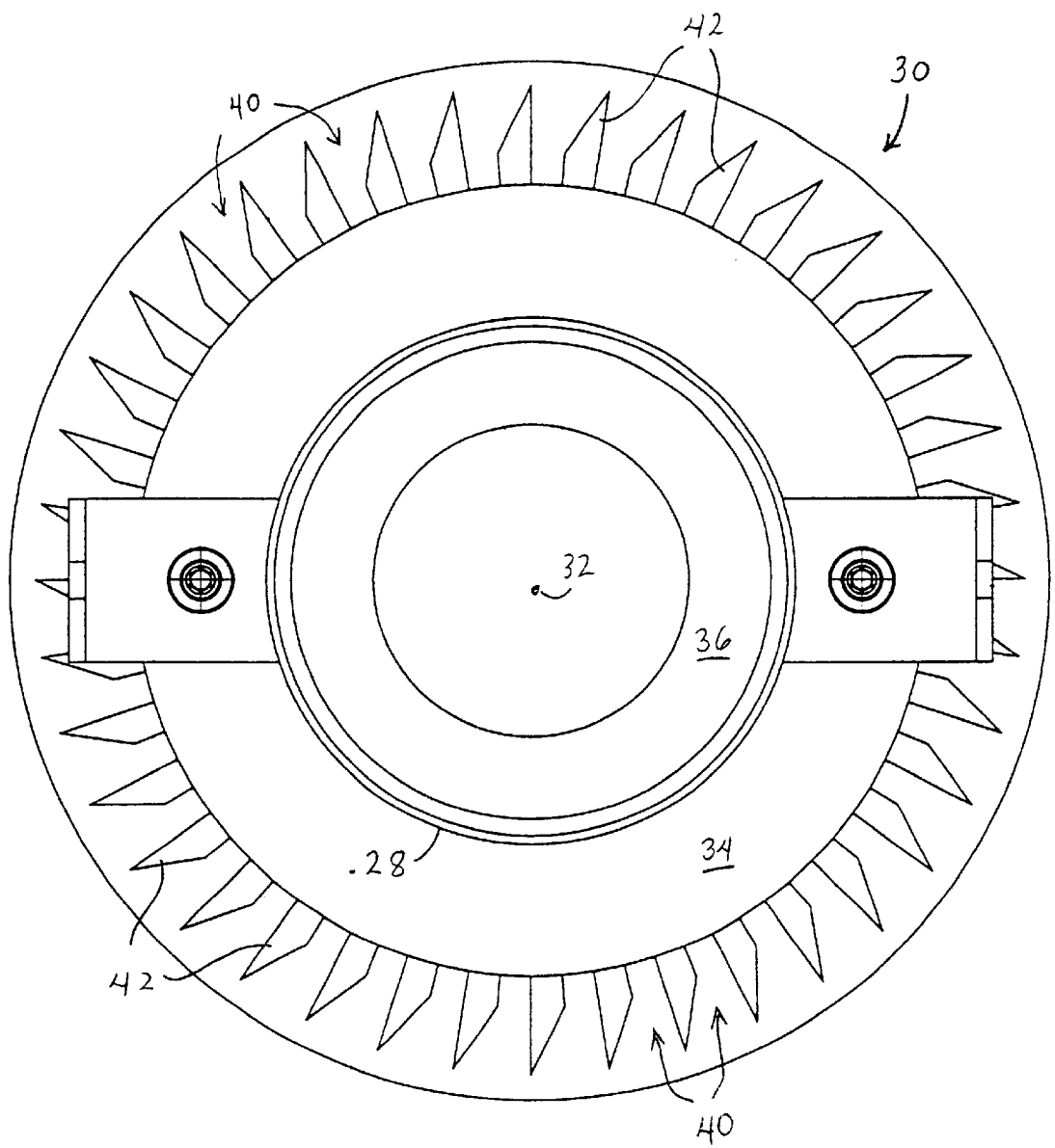
FIG. 11A representatively shows a schematic, top view of the housing illustrated in FIG. 11.
Figure 11B:
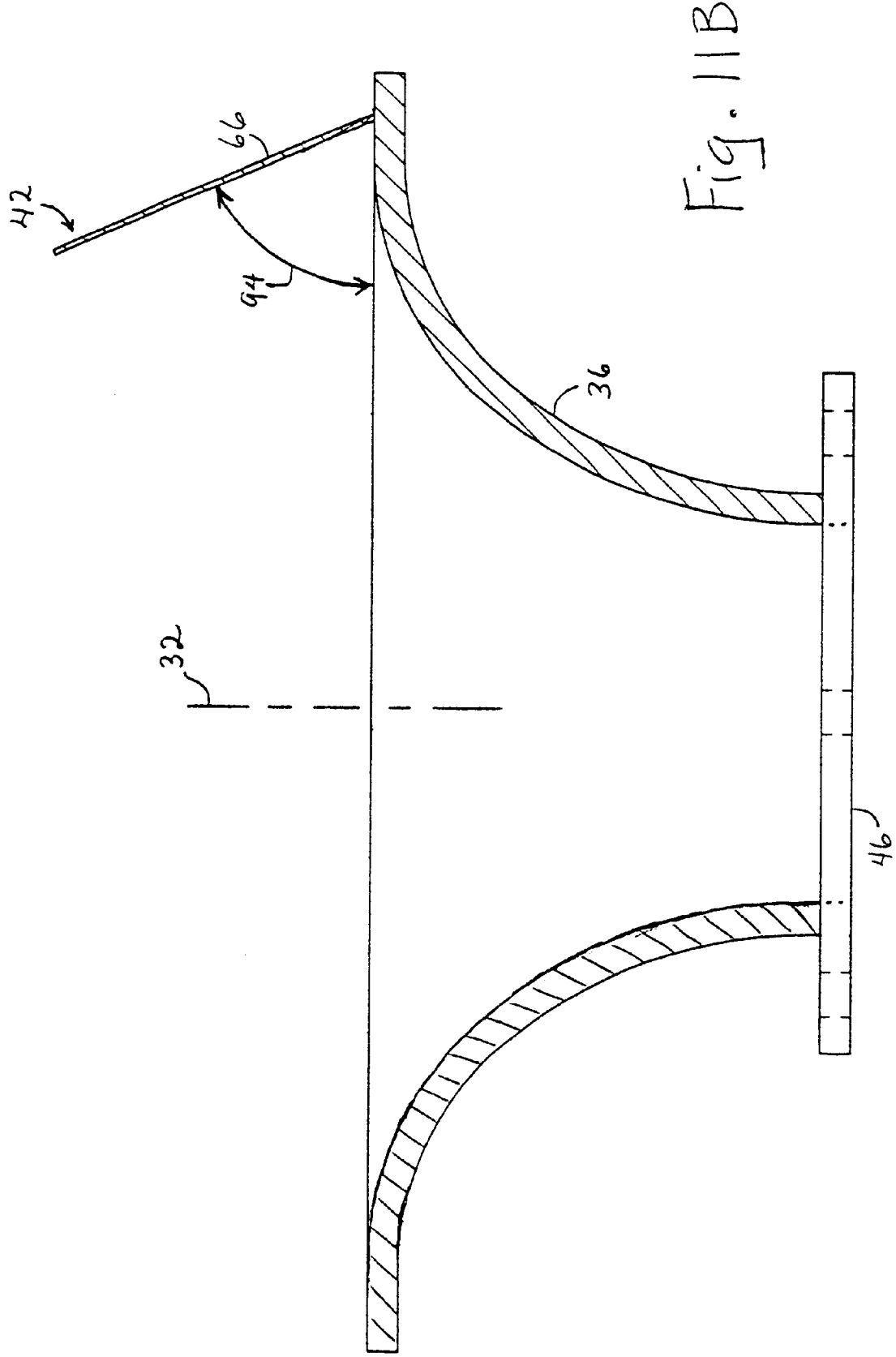
FIG. 11B representatively shows a schematic, partial cross-sectional view of the housing illustrated in FIG. 11, wherein a single, representative louver is retained to illustrate the alignment and tilt angle of an individual louver.

In the representatively shown arrangements, the length-wise dimensions of the louvers 42 are aligned substantially parallel to the housing axis 32. Alternative aspects of the invention can include louvers which have their length-wise dimensions aligned non-parallel with the housing axis 32. For example, a particular feature of the invention can include one or more louvers which have a predetermined tilt angle 94 (e.g. FIG. 11B). The louver has two, longitudinally opposed, length-wise end portions, and one length-wise end of the tilted louver positioned relatively closer to the housing axis than an opposed, length-wise end of that louver. The tilt angle is determined between a line that is parallel to a substantially fixed, length-wise edge region of the louver; and a line that intersects the substantially fixed edge region and lies tangent to the inner surface of the bottom member 36 at the location of the substantially fixed edge region 66 of that louver. Such tangent line is also aligned to intersect the housing axis 32. In particular aspects, the tilt angle 94 can be at least a minimum of about 45 degrees. The tilt angle can alternatively be at least about 60 degrees, and optionally, can be at least about 75 degrees to provide improved performance. In other aspects, the tilt angle can be not more than a maximum of about 135 degrees. The tilt angle can alternatively be not more than about 120 degrees, and optionally, can be not more than about 105 degrees to provide improved effectiveness. In desired arrangements, the tilt angle can be about 90 degrees.

If the tilt angle is arranged at other angles, the housing airflow may be undesirably skewed or otherwise misdirected from the desired motions. Additionally, excessive pressure drops and/or excessive turbulence may be produced in the housing.

Figure 13:
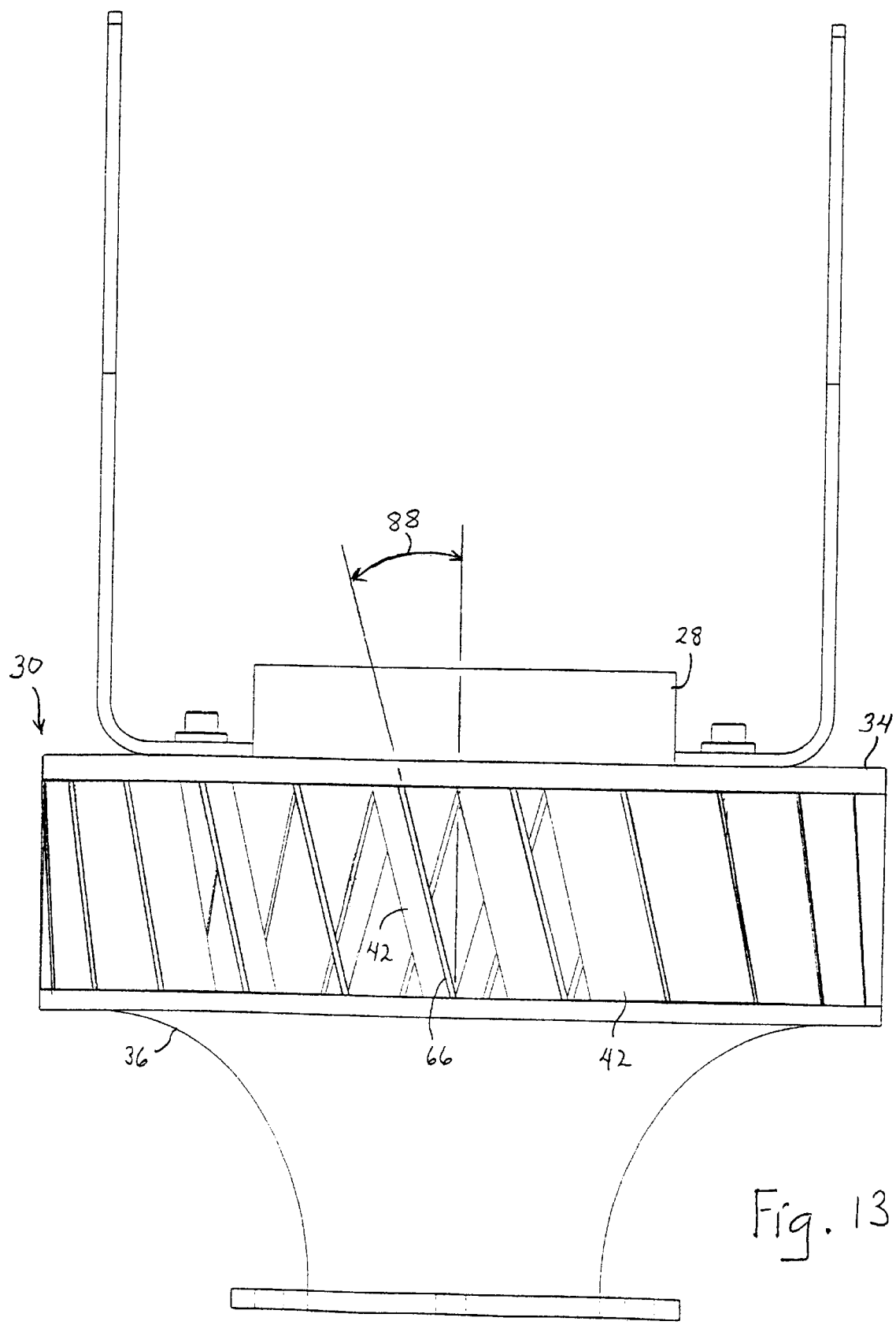
FIG. 13 representatively shows a side view of an intake housing having a louvers arranged with a selected slant angle.

Another aspect of the invention can include one or more louvers which have a predetermined slant angle 88, as representatively shown in FIG. 13. When providing the slant angle, the longitudinally opposite ends of the fixed edge region 66 of the slanted louver may or may not be located substantially equidistant from the housing axis 32. In either case, one end of the substantially fixed edge region 66 of the slanted louver is operatively positioned at a different circumferential position around the housing axis, as compared to the opposed end of that louver, to thereby provide the selected slant angle 88. The slant angle can desirably be configured and arranged to operatively deflect or otherwise direct the housing gas flow in a direction generally toward the housing outlet conduit 46. In particular aspects, the slant angle can be up to about 15 degrees. The slant angle can alternatively be up to about 30 degrees, and optionally, can be up to about 45 degrees to provide desired performance. If the slant angle is outside the desired arrangements, the housing gas flow may be excessively turbulent, the deflection of the housing gas flow toward the outlet conduit 46 may be inadequate, and/or the maintenance of the desired swirling or cyclonic effect may be inadequate.

It is contemplated that the various alternative configurations of the invention can include one or more louvers having a selected combination of deflection, tilt angle and/or slant angle to provide improved performance.

Figure 6:
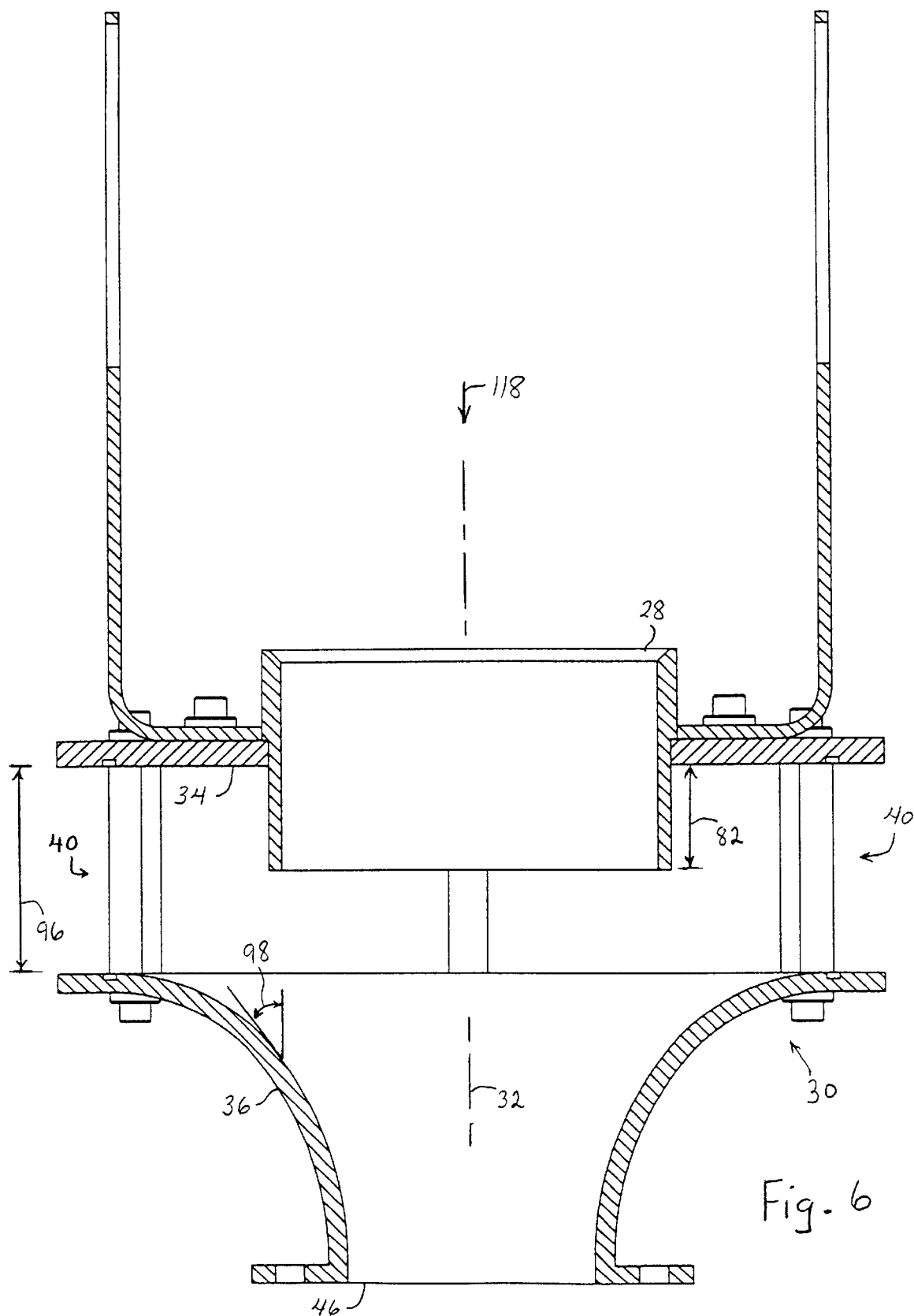
FIG. 6 representatively shows a schematic, cross-sectional view taken through the housing illustrated in FIG. 4, in which the louvers have been removed for clarity.
Figure 7:
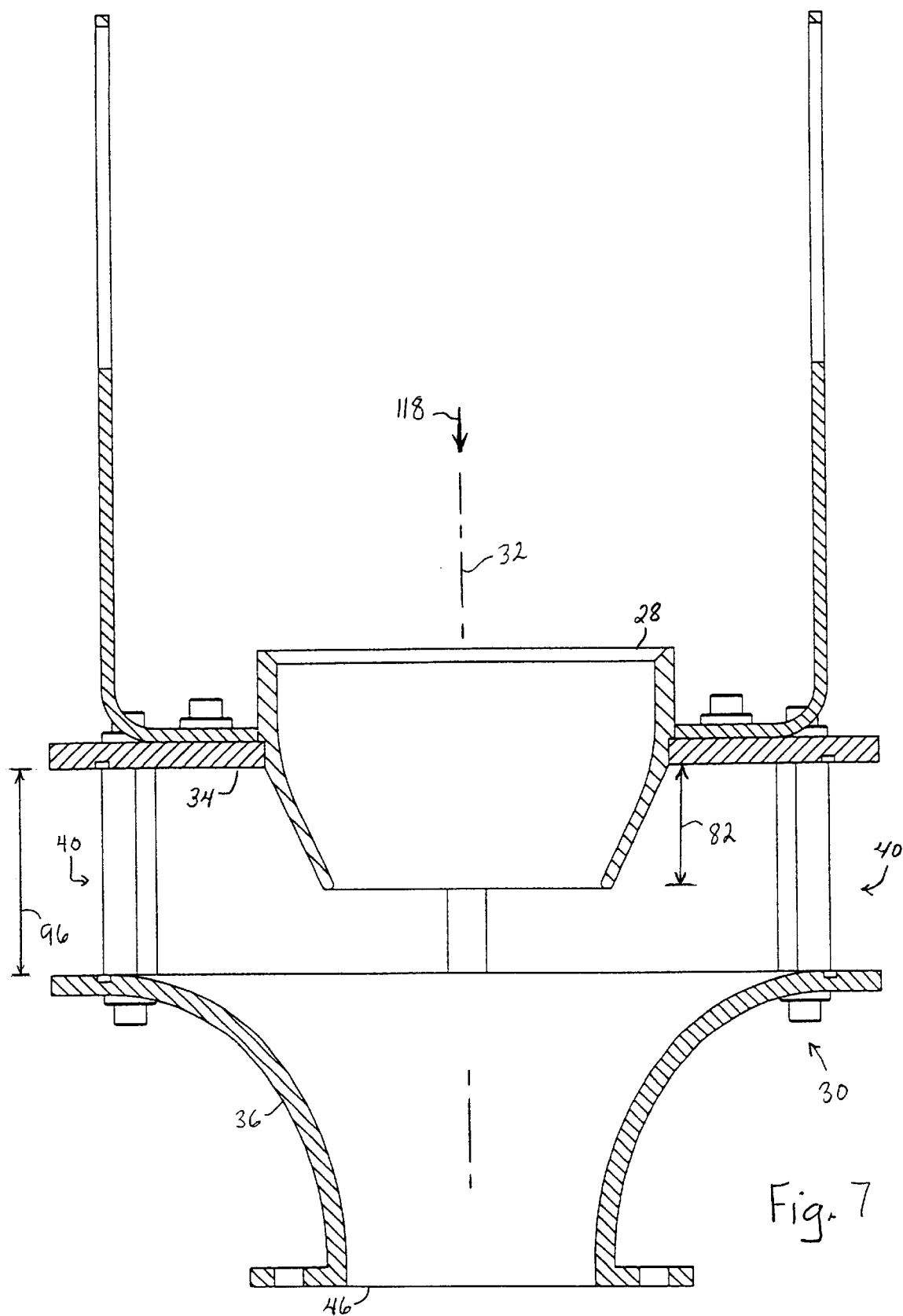
FIG. 7 representatively shows another schematic, cross-sectional view taken through another housing in which the louvers have been removed for clarity, and where an inlet conduit has a tapered or funnel-shape.

A further feature of the invention can include a configuring of the inlet conduit 28 to protrude through the housing top member 34 by a selected distance into the housing 30, as representatively shown in FIG. 6. As a result, the terminal end of the inlet conduit can be spaced inwardly from the location of the top edges of the control louvers 42 by an inlet distance 82. In another feature of the invention, the terminal end of the inlet conduit can be spaced inwardly from by the top member 34 by the inlet distance 82. Where the top member 34 lies approximately in the same plane as the top edges of the control louvers 42, the terminal end of the inlet conduit can be spaced inwardly from both the top member 34 and the top edges of the control louvers by the inlet distance 82.

In particular aspects, the inlet distance 82 can be a selected inlet percentage of a peripheral separation distance 96 (e.g. FIG. 6) between housing top member 34 and bottom member 36 as determined at the housing periphery. In particular aspects, the inlet percentage can be at least a minimum of about 5%. The inlet percentage can alternatively be at least about 10%, and optionally, can be at least about 15% to provide improved performance. In other aspects, the inlet percentage can be not more than a maximum of about 65%. The inlet percentage can alternatively be not more than about 60%, and optionally, can be not more than about 55% to provide improved effectiveness.

It has been discovered that the particulate material may not always fall within the projected circumference of the housing outlet conduit 46. The particulate material may, for example, be being metered out of the feed mechanism 58 fast enough to give it a significant horizontal or radial component of velocity, which could cause the particles to hit the housing bottom member 36 outside of an intended target area where the angle of incidence would be small. This can cause the particles to bounce around in the housing and occasionally bounce out of the housing. The extended inlet distance 82, however, can help guide the falling particles into the center of the funnel-shape of the bottom member. In a desired configuration, the inset distance can be about 2.54 cm (about 1 inch) to provide a desired combination of guiding the particles further into the funnel-shape and keeping the housing open for unrestricted airflow.

Figure 9:
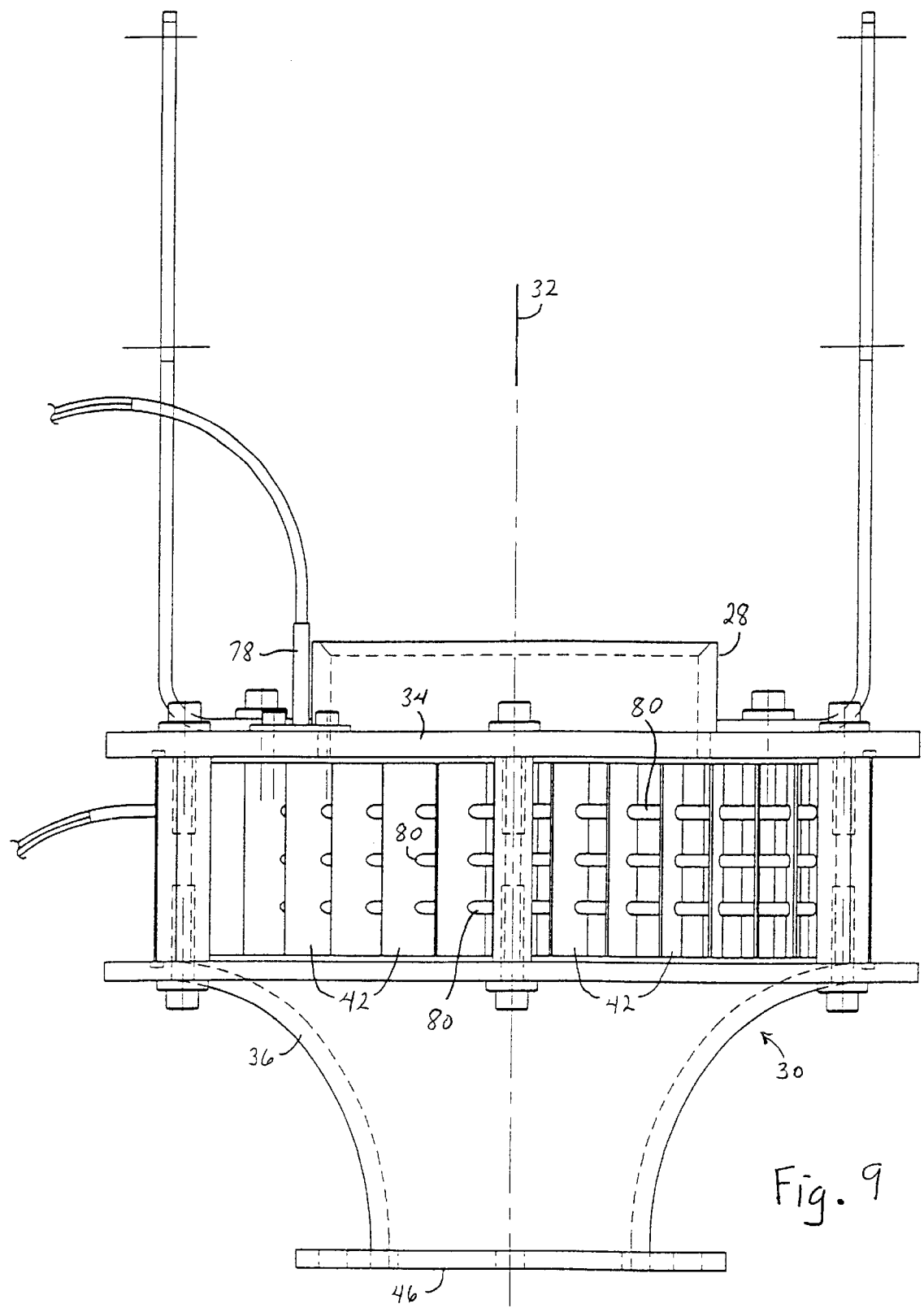
FIG. 9 representatively shows a schematic, side view of a intake housing having a heating mechanism.
Figure 9A:
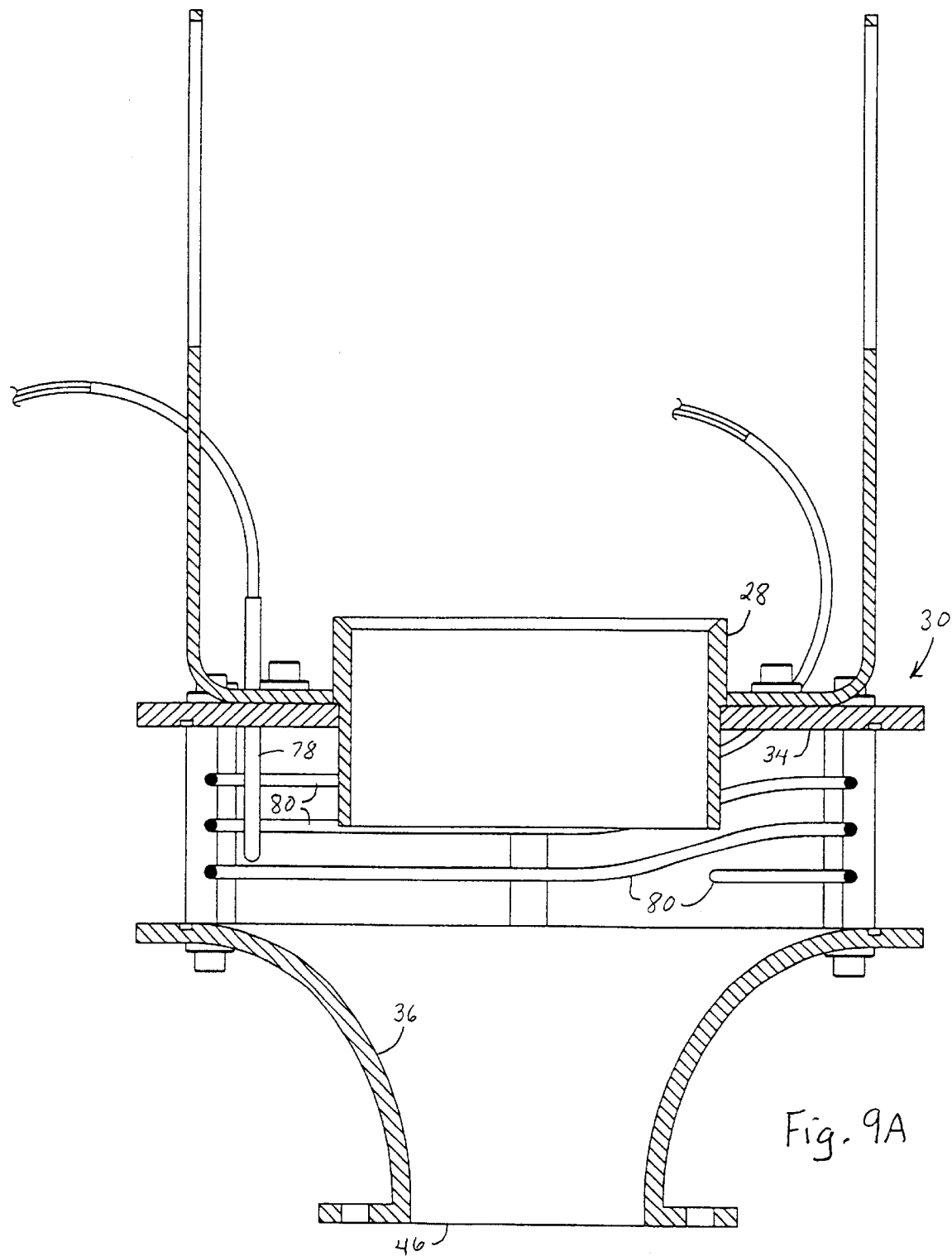
FIG. 9A representatively shows a schematic, cross-sectional view of the housing illustrated in FIG. 9, where the louvers have been removed for clarity.
Figure 10:
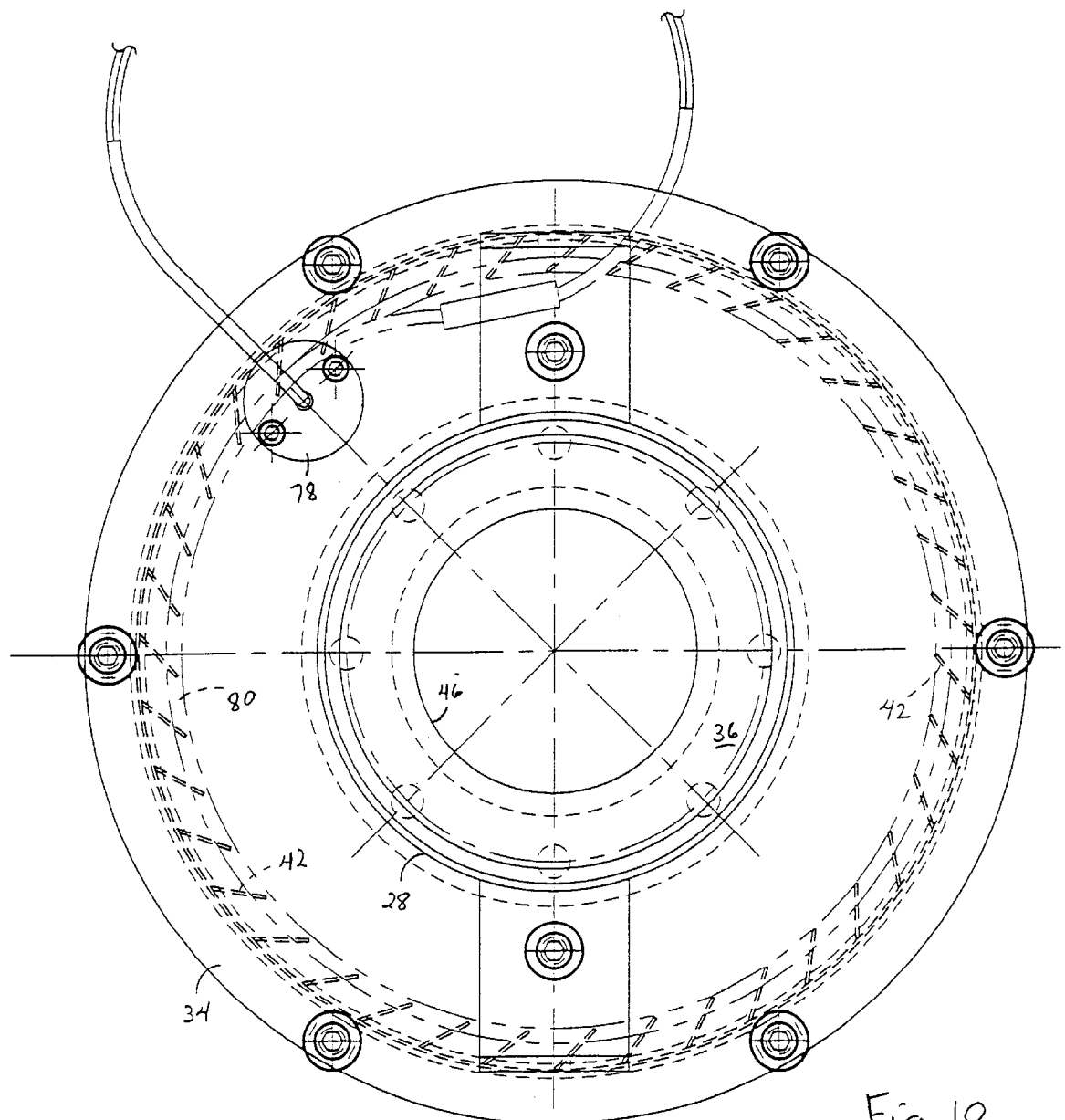
FIG. 10 representatively shows a schematic, top view of the housing illustrated in FIG. 9.
Figure 10A:
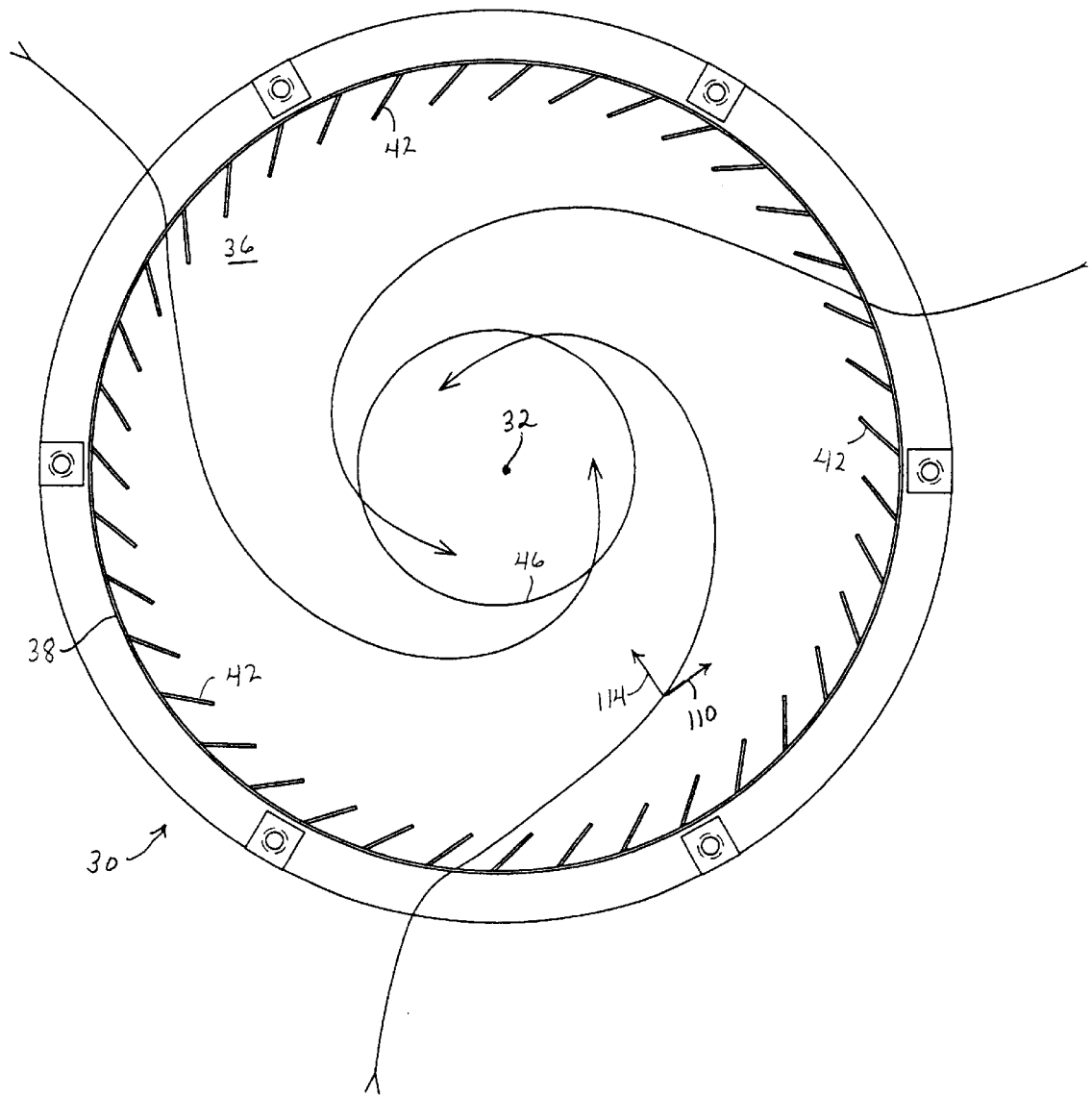
FIG. 10A representatively shows schematic, top view of the inside of the housing illustrated in FIG. 10.

With reference to FIGS. 9 through 10, the process and apparatus of the invention can further include a selected heating of the housing gas flow to reduce an undesired clumping of the particles. For example, the technique of the invention can include an operative heater 80. In the representatively shown configuration, for example, a cable-type heater can be operatively connected to the housing 30 to provide a selected heating of at least a portion of the housing, and thereby heat the interior of the housing to produce the desired reduction in clumping of the particulate material. A suitable heater can, for example, include a Model 125 CH 47 A3X heater available from Watlow Electric Manufacturing Company, a business having offices located in St. Louis, Mo. Alternatively, a substantially equivalent device may be employed. In a particular configuration, the heater can have the form of a generally helical coil, and the coil can be operatively mounted and held by notches formed into the louvers 42. As illustrated in FIGS. 8A, 8C, and 8D selected notches may have necked-down openings to help hold and secure the heater in the housing 30. A conventional temperature sensor 78 can be employed to help provide a selected control and regulation of a desired temperature.

It should be readily appreciated that the housing 30, its various constituent parts, and its various associated conduits or other components may be constructed of any suitable material, such as metal, plastic, other synthetic polymers or the like, as well as combinations thereof. In desired configurations, the housing can be constructed of a wear resistant material, such as stainless steel.

It should also be readily apparent that the various components can be operatively assembled together by employing conventional techniques. Such techniques can, for example, include fasteners or other mechanisms, such as pins, rivets, screws, nuts and bolts, staples, hook-and-loop fasteners, interengaging latching devices and the like, as well as combinations thereof. The assembly techniques can also include bonding mechanisms, such as adhesives, sonic bonds, welds, soldering, brazing or the like, as well as combinations thereof.

Another feature of the invention can include a directing of at least a portion of the housing gas flow and the particulate material from the housing 30 and into the moving gas stream. In a more particular aspect, at least a portion of the housing gas flow and particulate material are directed into the transport conduit 48 which contains the moving gas stream. In a further feature, the invention can include a transporting of the particulate material 22 through the transport or eductor conduit 48 with the moving gas stream. Desirably, the transporting can be configured to provide a selected transport rate of the particulate material. In particular aspects, the transport rate can have a distinctively low level of variation. If the transport rate of the particulate material has a variation which is too large, there can be an excessive variation of the amount of particulate material contained in the final products produced with the invention.

Where the invention is employed to distribute superabsorbent particles in the absorbent pads of an interconnected series of individual diapers, for example, there can be an excessive variation in the absorbencies of the individual diapers.

In desired configurations, the housing outlet conduit 46 can be arranged to operatively direct the particulate material into the eductor or transport conduit 48 which carries the moving gas stream, and the transport conduit 48 can operably connect to further processing operations and equipment. The processing operations may include various web forming techniques. Such techniques may include an air-forming operation, a coform operation, a wet-forming operation or the like, as well as combinations thereof.

As illustrated in the representatively shown arrangement, the transport conduit 48 may operably connect to a web forming system which includes a forming chamber 50. The forming chamber can include a foraminous forming surface 52 which moves through the forming chamber, and a nozzle 86 for directing particulate material into the forming chamber. Additionally, the forming chamber can include a suitable source of fibrous material, such as the representatively shown fiberizer 74. Accordingly, the technique of the invention can further provide a depositing of a selected particulate material, such as particulate superabsorbent material, in an airlaid fibrous web 54. The technique can include a moving of a forming surface 52 through an operative forming chamber 50, and a laying of the fibrous material onto the forming surface to form the fibrous web. In a particular aspect, the particulate material can be delivered into the forming chamber with a nozzle 86 which is positioned within the forming chamber 50 at a location spaced from the forming surface 52.

Desirably, the fibrous material can provide an operative fibrous matrix for holding and containing the superabsorbent material, and the formed web has a selected z-directional thickness. In combination with further processing, the method and apparatus of the invention can be employed to form an article which includes a component composed of the representatively shown absorbent web 54.

With reference to FIG. 1, the method and apparatus of the invention can include a rotatable, vacuum forming drum 64 which is operatively enclosed by the forming chamber 50. The forming drum can have a circumferential, outer periphery which provides the forming surface 52, and the moving of the forming surface can be provided by the rotation of the forming drum. A conventional source of a selected fibrous material, such as a supply reservoir or a conventional fiberizer 74, can be configured to provide an operative supply of fiber material into the forming chamber 50. As representatively shown, the fiberizer 74 can be operatively positioned above the forming chamber and can include a conventional, rotary hammermill, or the like. In alternative arrangements, the fiberizer may be located to the side of the forming chamber, or may be positioned at a selected remote location that is spaced away from the forming chamber.

The fiber material may include natural fibers, synthetic fibers, and combinations thereof. Examples of natural fibers can include wood pulp fibers, cotton fibers, wool fibers, silk fibers and the like, as well as combinations thereof. Synthetic fibers can include rayon fibers, polyolefin fibers, polyester fibers and the like, as well as combinations thereof. Typically, the fiber material includes wood pulp cellulose fibers.

As representatively shown, an operative portion of the representatively shown forming drum 64 is appropriately enclosed by the forming chamber 50. The forming drum has an axis of rotation, and the direction of rotation can be either clockwise or counter-clockwise, as desired. The configuration representatively shown in FIG. 1 has a substantially counter-clockwise direction of rotation. The selected forming drum 64 can be constructed and configured with a conventional "vacuum" system which generates a primary, air stream airflow from the interior of the forming chamber 50, through the forming surface 52 and into the interior of the forming drum 64. Examples of suitable forming drum systems for producing airlaid fibrous webs are well known. For example, see U.S. Pat. No. 4,666,647 entitled APPARATUS AND METHOD FOR FORMING A LAID FIBROUS WEB by K. Enloe et al. which issued May 19, 1987; and U.S. Pat. No. 4,761,258 entitled CONTROLLED FORMATION OF LIGHT AND HEAVY FLUFF ZONES by K. Enloe which issued Aug. 2, 1988; the entire disclosures of which are incorporated herein by reference in a manner that is consistent herewith. Examples of techniques which can inject a directed stream of superabsorbent particles into a forming chamber are described in U.S. Pat. No. 4,927,582 entitled METHOD AND APPARATUS FOR CREATING A GRADUATED DISTRIBUTION OF GRANULE MATERIALS IN A FIBER MAT by R. E. Bryson which issued May 22,1990; the entire disclosure of which is incorporated herein by reference in a manner that is consistent herewith.

The forming chamber 50 typically includes a front entrance wall, a rear exit wall, an appropriate pair of opposed side walls, and a top cover wall, which are assembled together and configured in a conventional manner to suitably enclose an operative internal, forming volume of the forming chamber 50. As the forming drum 64 rotates, the fiber material is entrained by the air stream of the primary airflow drawn through the forming surface 52, and the fibers becomes deposited onto the forming surface. The fiber material is gradually accumulated onto the outer peripheral, forming surface 52 as the rotating forming drum moves the forming surface through the forming chamber. During the movement of the forming surface, the rate of the fiber accumulation and amount of fibrous web formation will vary, depending upon the process position along the length of the forming chamber. The greater rates of fiber accumulation and the greater amounts of web formation will typically occur towards the beginning, entrance-wall end of the forming chamber. Relatively smaller rates of fiber accumulation and relatively smaller amounts of web formation will typically occur towards the ending, exit-wall end of the forming chamber.

The forming surface 52 is typically a foraminous, air permeable component, such as provided by a wire forming cloth, a screen, a perforated plate or the like, as well as combinations thereof. Additionally, the air permeable component may be composed of metal, plastic, ceramic or the like, as well as combinations thereof. The forming surface may also include a porous tissue, a woven fabric, a non-woven fabric and the like, as well as combinations thereof. The illustrated configuration can, for example, include a forming surface provided by a perforated plate, a hard-wire foraminous forming screen or the like. The forming surface can be composed of any durable material, such as durable plastic, metal or the like. For example, the forming surface may be composed of bronze or stainless steel.

During the system operation, the formed absorbent web 54 is operatively removed from the forming surface 52 and is directed for further processing. For example, as the formed fibrous web exits from the forming chamber 50, a scarfing system can be employed to adjust the basis weight of the formed web. In particular arrangements, the scarfing system can include a conventional, rotatable scarfing roll which is configured to contact an exposed surface of the formed, absorbent web 54 and to remove material from the web to provide a more uniform basis weight to the final web. The removed material can be directed through an appropriate, scarfing exit conduit for further processing. The removed material may, for example, be recycled back into the forming chamber, may be recycled into the fiberizer, or may be directed and transported to a supplemental processing operation, as desired.

Further processing may, for example, include a debulking, compressing or densifying operation. Additionally, the fibrous web 54 can be combined with other components to produce a final manufactured article. In the manufacture of a disposable absorbent garment, for example, the fibrous web can be combined with a liquid-permeable topsheet layer, a substantially liquid-impermeable backsheet layer, elastic members and fasteners, as well as other components.

An alternative configuration of the invention can include a translating of a recirculating, endless forming belt which has an outer periphery that provides the forming surface 52. Accordingly, the transporting of a generally flat, linearly moving section of the endless forming belt can operatively provide a moving forming surface 52 traveling through an appropriately cooperating, generally linear forming chamber. Conventional air forming systems which incorporate an endless forming belt are well known in the art. For example, conventional belt forming systems are available from the Paper Converting Machine Corp., a business having offices located in Green Bay, Wis.

The introduction of the superabsorbent material into the system for forming the desired fibrous web may be configured to be substantially continuous or non-continuous. Examples of suitable systems for providing an intermittent or pulsed delivery of superabsorbent material are described in U.S. Pat. No. 5,028,224 entitled METHOD AND APPARATUS FOR INTERMITTENTLY DEPOSITING PARTICULATE MATERIAL IN A SUBSTRATE AND ARTICLE MADE THEREWITH by C. Pieper et al. which issued Jul. 2, 1991, the entire disclosure of which is hereby incorporated by reference in a manner that is consistent herewith.

Other alternative configurations of the invention can include a substantially open forming system which does not have a forming chamber extending between the fiberizer and the forming surface. One type of open forming system is the coform process. Examples of suitable coforming methods and apparatus are described in U.S. Pat. No. 4,100,324 entitled NONWOVEN FABRIC AND METHOD OF PRODUCING SAME by R. Anderson which issued Jul. 11, 1978; the entire disclosure of which is hereby incorporated by reference in a manner that is consistent herewith. Another type of open air forming system is an airlaid process which can incorporate fiber and particulate distribution systems located atop a translating, recirculating, endless forming belt. For example, conventional airlaid forming systems are available from the Dan-Webforming Ltd., business having offices located in Risskov, Denmark.

A desired absorbent web may also be produced by employing a wet-forming technique. Examples of wet-forming techniques are described in U.S. Pat. No. 5,651,862 entitled WET-FORMED ABSORBENT COMPOSITE by Anderson et al. which issued Jul. 29, 1997; and U.S. Pat. No. 6,046,377 entitled ABSORBENT STRUCTURE COMPRISING SUPERABSORBENT, STAPLE FIBER, AND BINDER FIBER by Huntoon et al. which issued Apr. 4, 2000. The entire disclosures of these documents are incorporated herein by reference in a manner that is consistent herewith.

Having described the invention in rather full detail, it will be readily apparent that various changes and modifications can be made without departing from the concept of the invention. All of such changes and modifications are contemplated as being within the scope of the invention as defined by the subjoined claims.

We claim:

1. A process for directing particulate material into a moving gas stream, comprising:

a delivering of said particulate material from a particulate reservoir along a delivery direction into a housing having a housing axis;

a measuring of a weight of particulate material that is delivered from said particulate reservoir;

an introducing of a housing gas flow Into said housing through at least one entry gas port that has been provided in said housing, said housing gas flow arranged to combine with said particulate material that is delivered from said particulate reservoir; and an imparting of a swirling motion to said housing gas flow, said swirling motion having at least a rotational component of movement that is directed substantially circumferentially about said housing axis.

2. A process as recited in claim 1, further including a regulating of a rate of delivery of said particulate material from said particulate reservoir.

3. A process as recited in claim 1, further including a providing of a radial component of motion to said housing gas flow, said radial component of motion directed substantially radially inward toward said housing axis.

4. A process as recited in claim 3, further including a providing of an axial component of motion to said housing gas flow, said axial component of motion directed substantially along said housing axis.

5. A process as recited in claim 4, wherein said housing axis has been aligned substantially along said delivery direction.

6. A process as recited in claim 1, wherein said introducing of said housing gas flow introduces said housing gas flow through a plurality of entry ports that have been provided in said housing.

7. A process as recited in claim 6, further including a configuring of said entry ports to provide a total gas entry area which is at least about 20 $cm^2$.

8. A process as recited in claim 7, further including an incorporating of a plurality of louvers into said housing to thereby provide said plurality of entry ports, said louvers configured in an array which is distributed around said housing axis.

9. A process as recited in claim 8, further including an arranging of said louvers with a deflection angle of at least about 20 degrees.

10. A process as recited in claim 1, further including a providing of said housing with a substantially cylindrical shape along its radially outboard periphery.

11. A process as recited in claim 10, wherein said housing has been provided with a top wall member, and a bottom wall member, and said process further includes a providing of said bottom wall member with a generally trumpet shape.

12. A process as recited in claim 10, wherein said housing has been provided with a top wall member, and a bottom wall member, and said process further includes a providing of said bottom wall member with a substantially frustrum-conical shape.

13. A process as recited in claim 1, further including a selected heating of said housing gas flow to reduce a clumping of said particulate material.

14. A process as recited in claim 1, further including a selected heating of at least a portion of said housing to reduce a clumping of said particulate material.

15. A process as recited in claim 1, further including a configuring of said inlet conduit to protrude a selected distance into said housing.

16. A process as recited in claim 1, further including a combining of said particulate material with fibers of a fibrous absorbent material within said forming chamber; and an airlaying of said particulate material and fibrous material on a foraminous forming surface.

17. An apparatus for directing particulate material into a moving gas stream, comprising:

a housing having a housing axis; and an inlet conduit for delivering said particulate material from a particulate reservoir along a delivery direction into said housing;

wherein said housing has a plurality of louvers for Introducing a housing gas flow into said housing, said housing gas flow is arranged to combine with said particulate material that is delivered from said particulate reservoir; said plurality of louvers are configured to impart a swirling motion to said housing gas flow, said swirling motion has at least a rotational component of movement which is directed substantially ciroumferentially about said housing axis.

18. An apparatus as recited in claim 17, wherein said louvers are configured in an array which Is distributed around said housing axis.

19. An apparatus as recited in claim 17, wherein said housing has a top wall member, and a bottom wall member, and said bottom wall member has a generally conical shape.

20. An apparatus as recited in claim 17, wherein said housing has a top wall member, and a bottom wall member, and said bottom wall member has a substantially frustrum-conical shape.

* * * * *